(12) United States Patent
Belden, Jr. et al.

(10) Patent No.: US 6,354,435 B1
(45) Date of Patent: *Mar. 12, 2002

(54) STORAGE CONTAINER FOR RECORDED MEDIA

(75) Inventors: Dennis D. Belden, Jr., Canton; James K. Sankey, Hudson; James M. Byrne, North Canton, all of OH (US)

(73) Assignee: Nexpak Corporation, North Canton, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/544,647

(22) Filed: Apr. 5, 2000

Related U.S. Application Data

(63) Continuation-in-part of application No. 09/245,944, filed on Feb. 5, 1999, now Pat. No. 6,065,594, which is a continuation-in-part of application No. 09/108,635, filed on Jul. 1, 1998, now Pat. No. 5,996,788.
(60) Provisional application No. 60/080,363, filed on Apr. 1, 1998.

(51) Int. Cl.[7] .............................................. B65D 85/57
(52) U.S. Cl. .................................... 206/310; 206/308.1
(58) Field of Search ............................ 206/232, 308.1, 206/309, 310, 312, 472, 493

(56) References Cited

U.S. PATENT DOCUMENTS

| | | | | |
|---|---|---|---|---|
| 4,327,831 A | * | 5/1982 | Inaba et al. ................. 206/310 |
| 4,895,252 A | * | 1/1990 | Nomula et al. .............. 206/310 |
| 5,551,560 A | * | 9/1996 | Weisburn .................. 206/308.1 |
| 5,746,314 A | | 5/1998 | Knutsen et al. ........... 206/308.1 |
| 5,788,068 A | * | 8/1998 | Fraser et al. ................ 206/310 |
| 5,896,986 A | | 4/1999 | Bolognia et al. ........... 206/310 |
| 5,950,822 A | | 9/1999 | Cloran et al. ............... 206/310 |
| 5,996,788 A | * | 12/1999 | Belden, Jr. et al. ......... 206/310 |
| 6,065,594 A | * | 5/2000 | Sankey et al. .............. 206/310 |

* cited by examiner

Primary Examiner—David T. Fidei
(74) Attorney, Agent, or Firm—Sand & Sebolt

(57) ABSTRACT

A storage container for an item of recorded media includes a centrally disposed hub surrounded by and spaced from an outer wall. The hub includes a pair of resilient arms that cooperate to loosely but securely retain an item of recorded media having a centrally disposed inner hole. The hub includes a first support platform that includes a plurality of raised bumps that essentially frictionlessly support the item of recorded media from below. The outer wall includes a second support platform that also includes a plurality of bumps that supports the item of recorded media from below about its outer periphery. The outer wall also includes a blocking wall that extends above the outer edge to prevent the user from grasping the outer edge of the item of recorded media. The outer wall further contains a finger access hole that extends through the blocking wall that allows the user to grab the edge of the item of recorded media in a selected position that is aligned with the arms of the hub. The arms of the hub are resiliently cantilevered from the first support platform. One arm includes a push button that allows a user to depress the arm and move it out of the way of the item of recorded media as it is being removed from the hub.

19 Claims, 14 Drawing Sheets

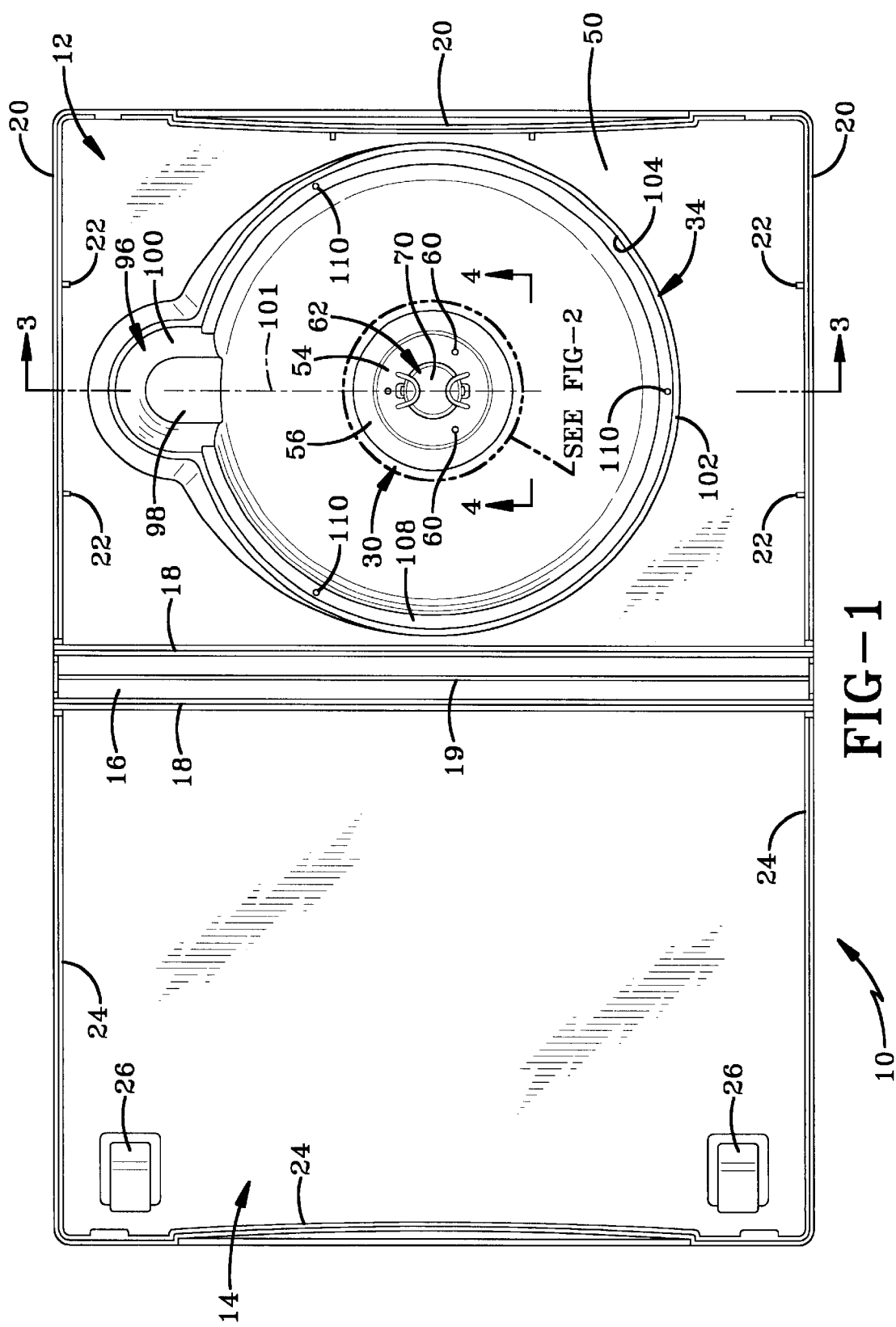

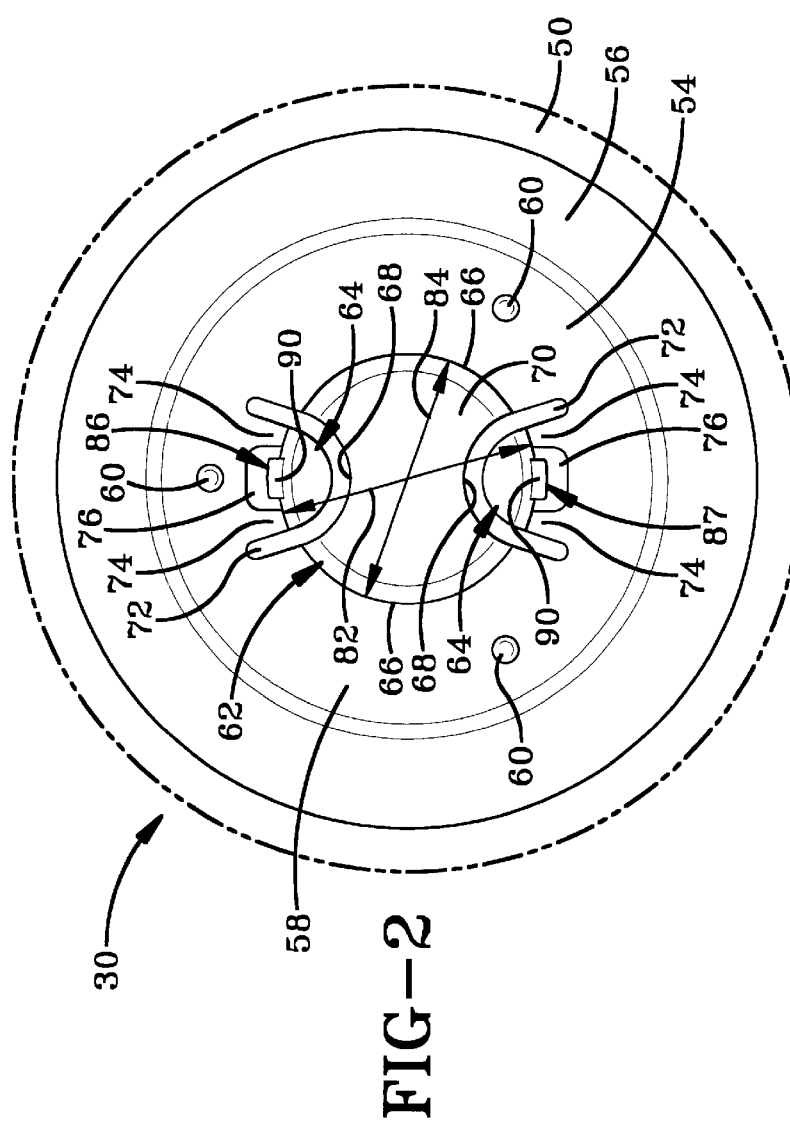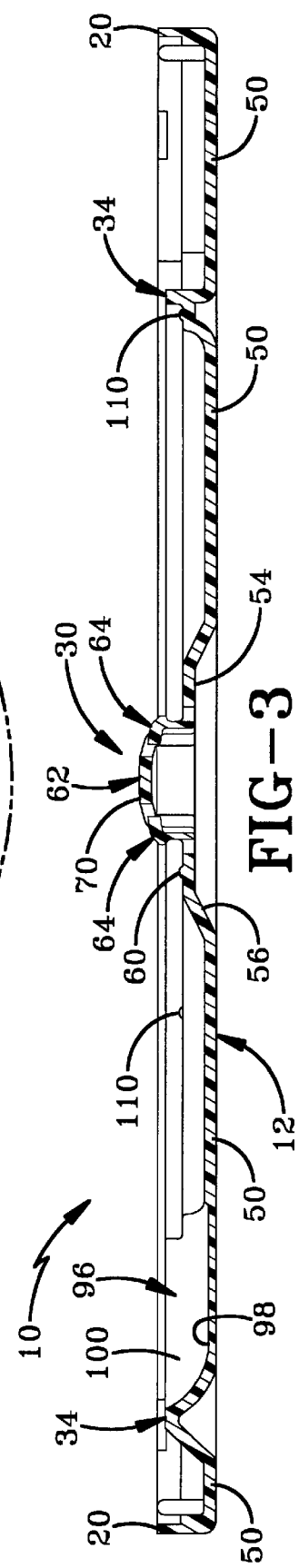

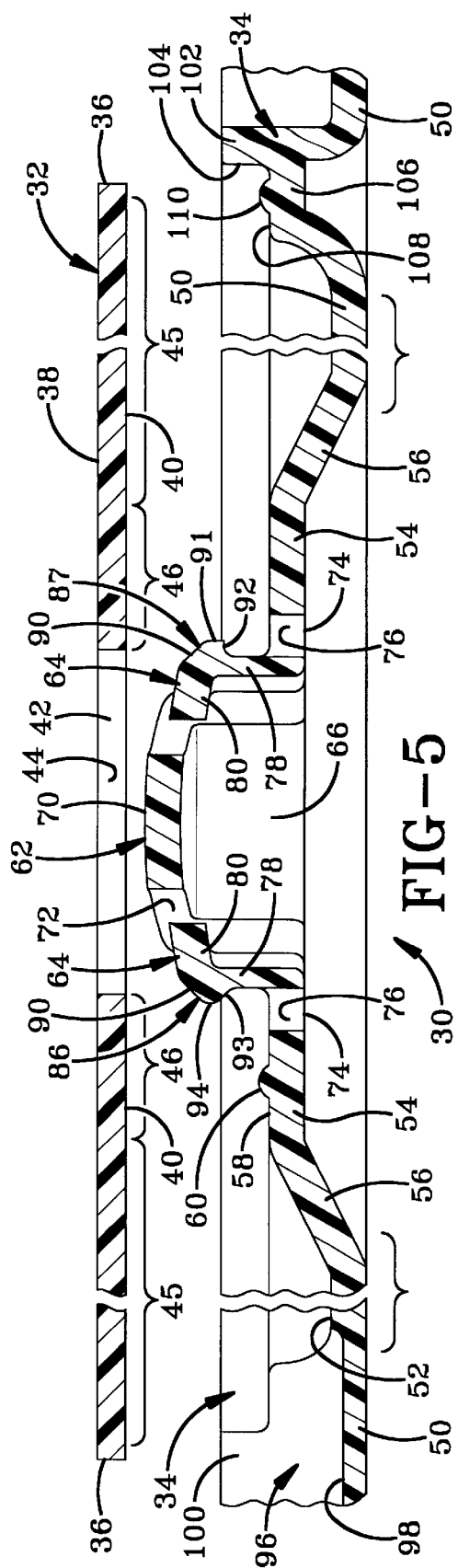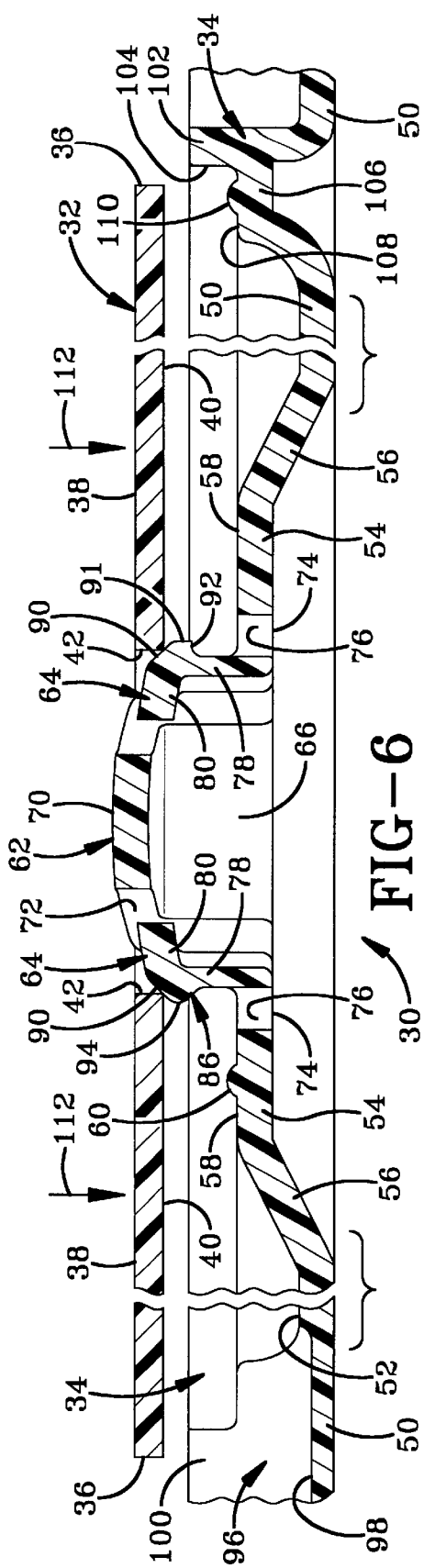

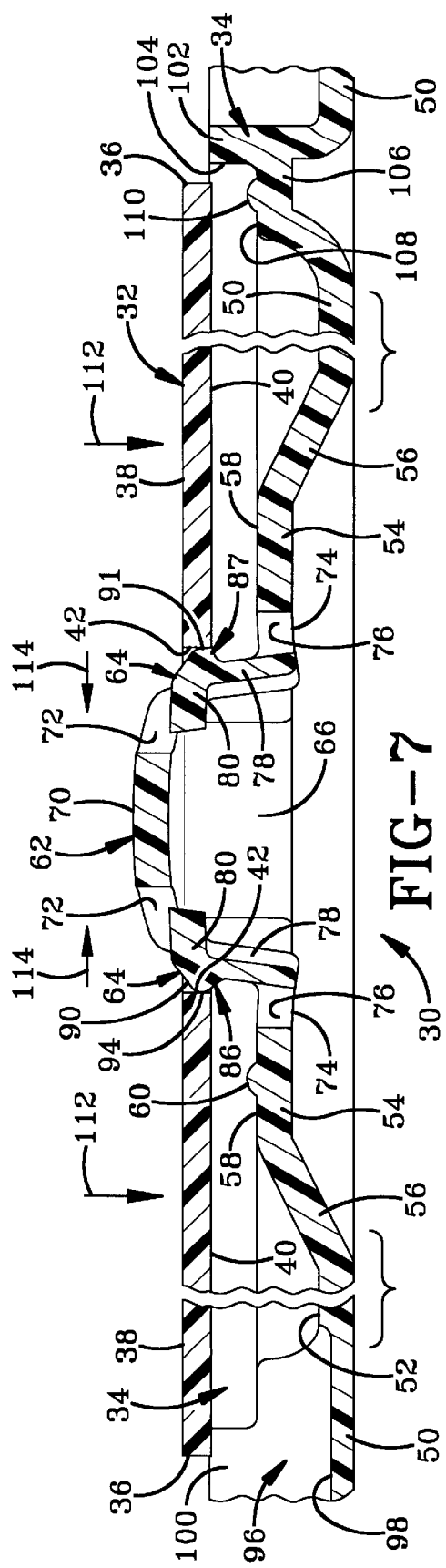
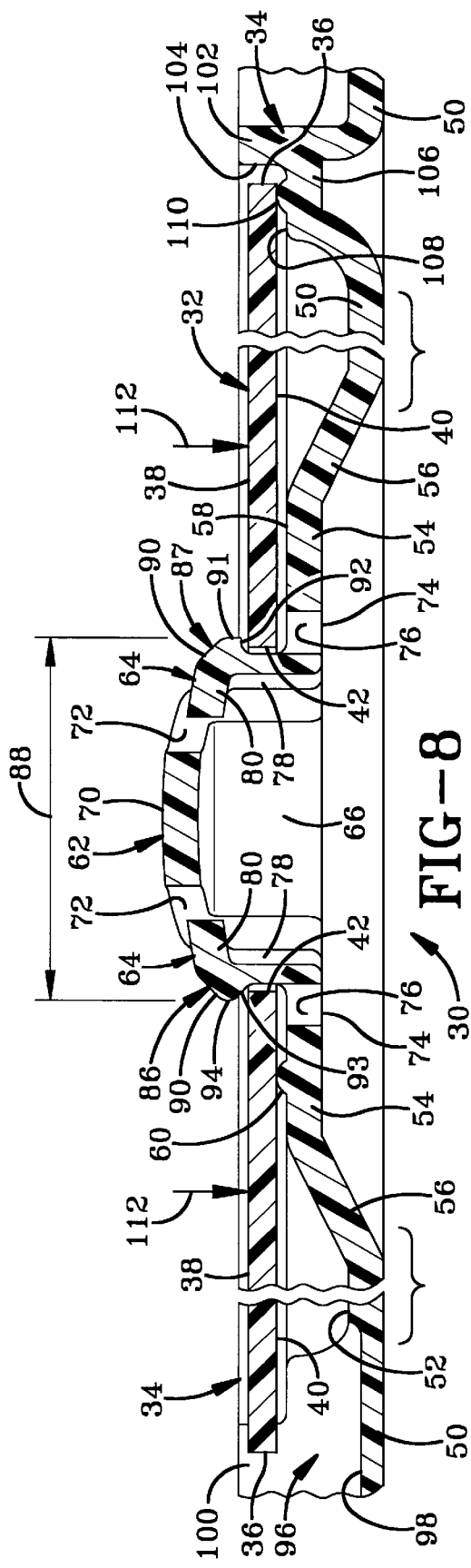

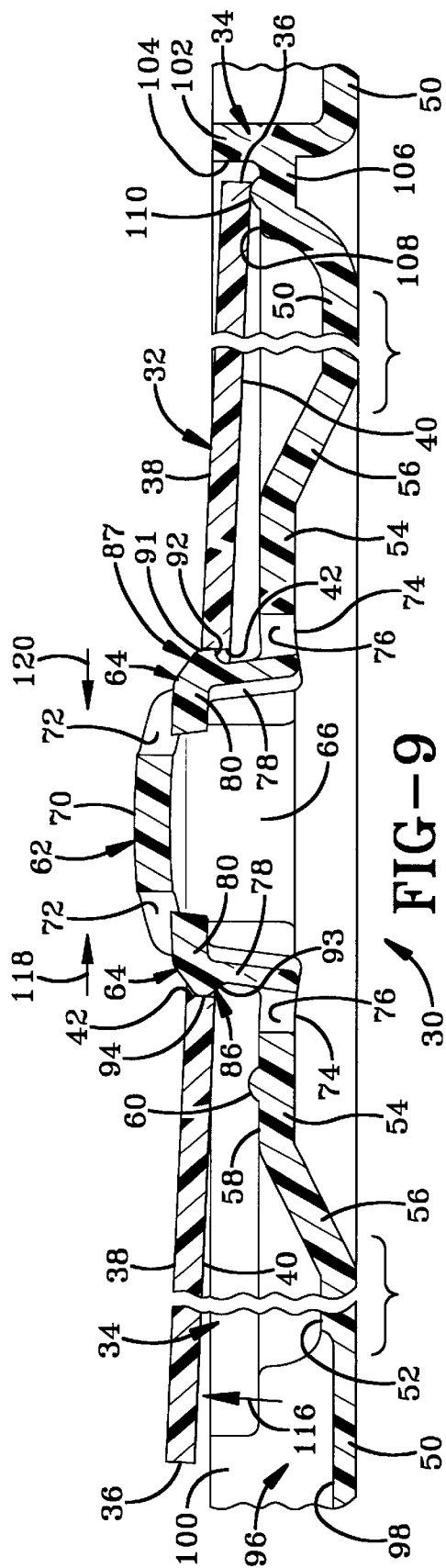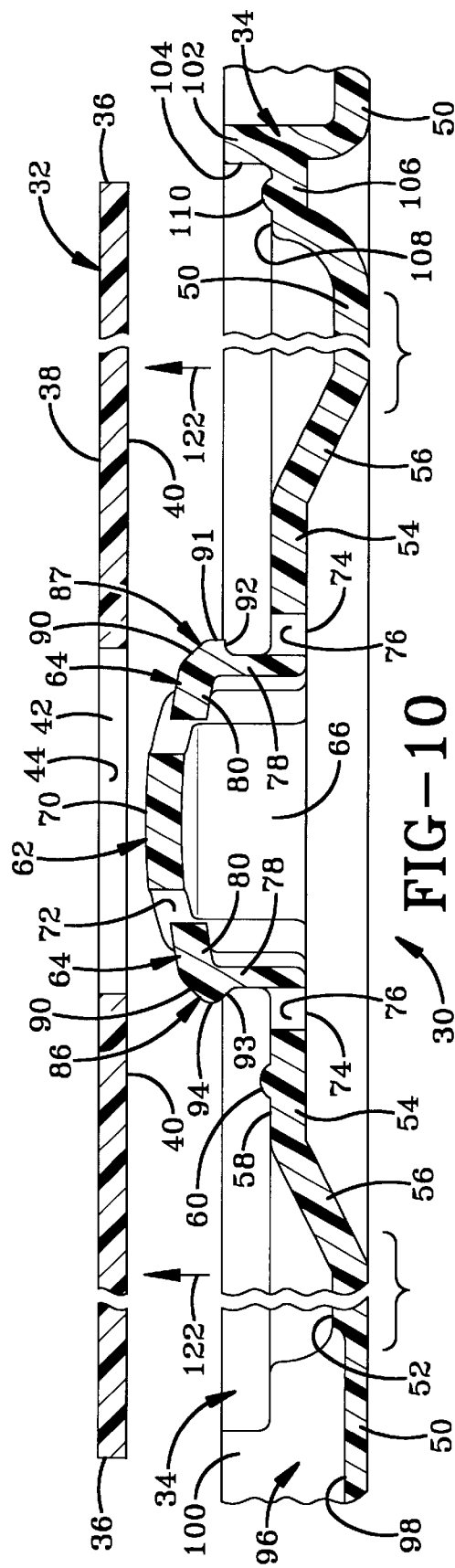

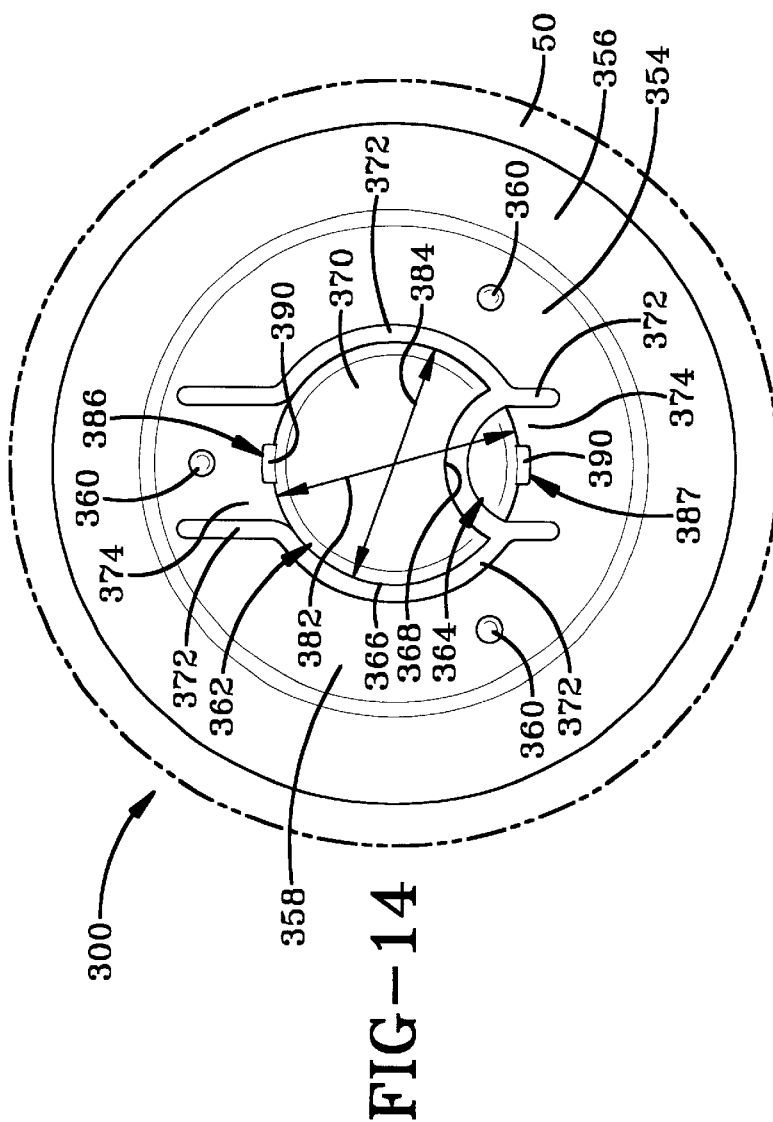
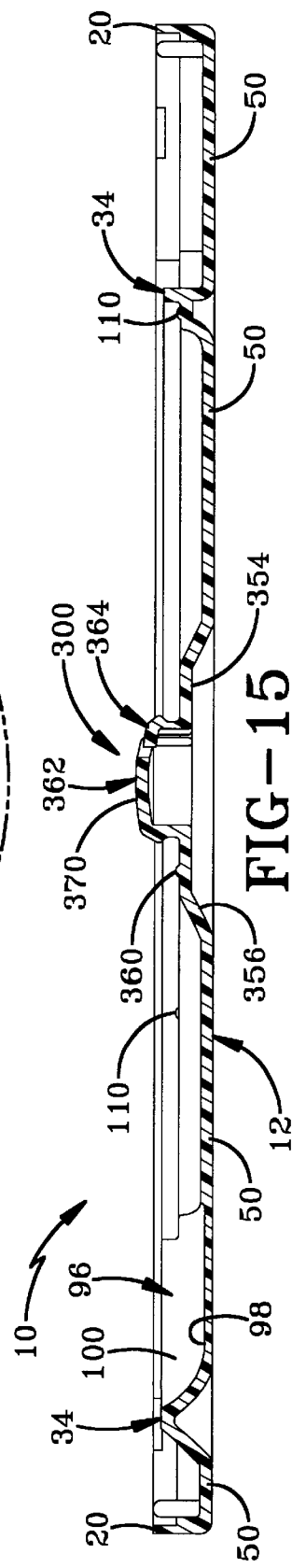

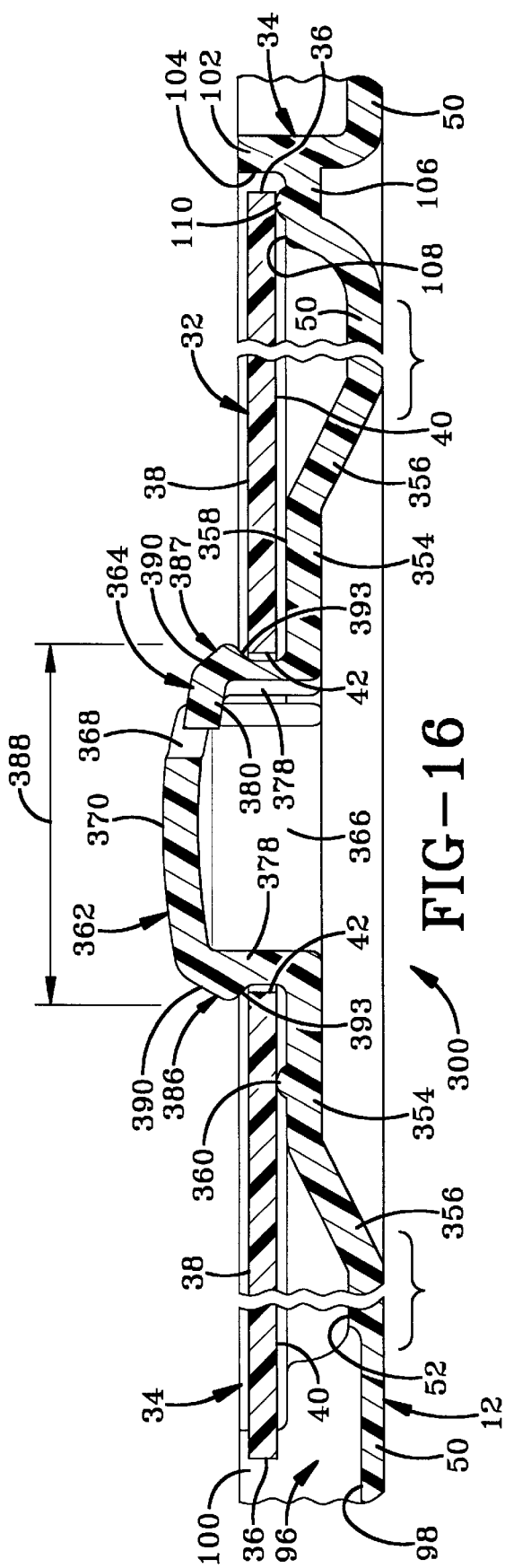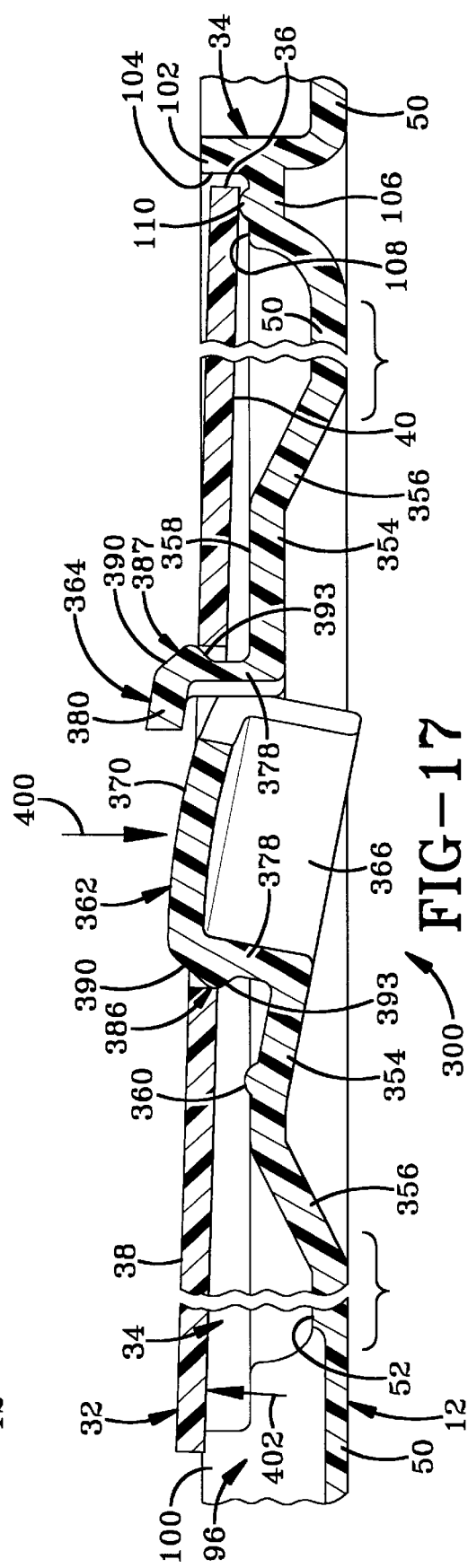

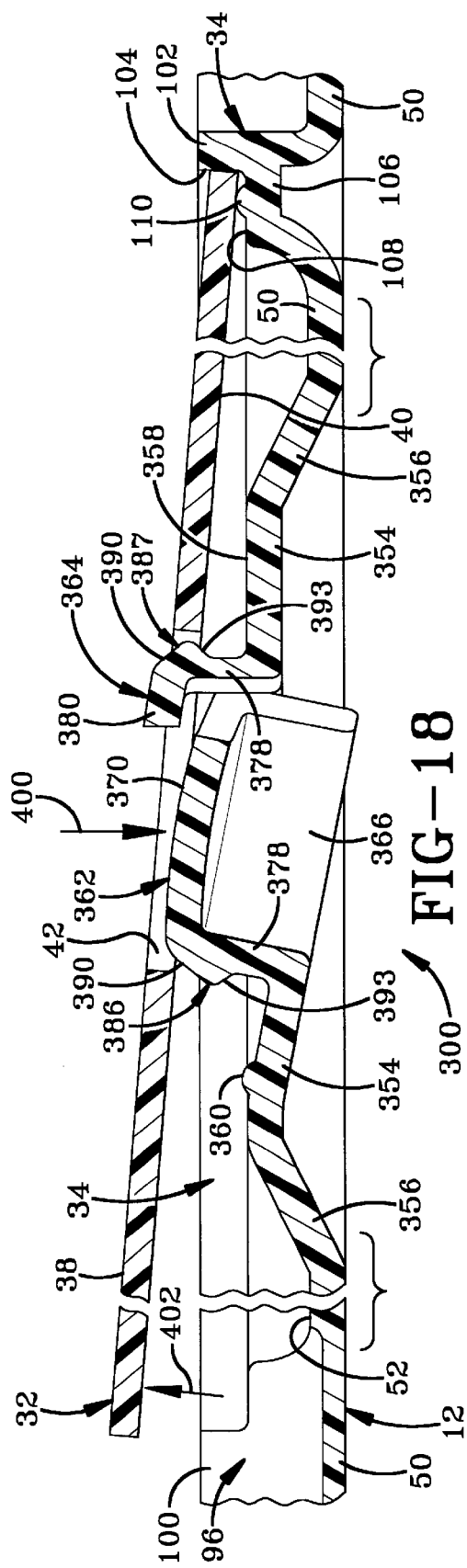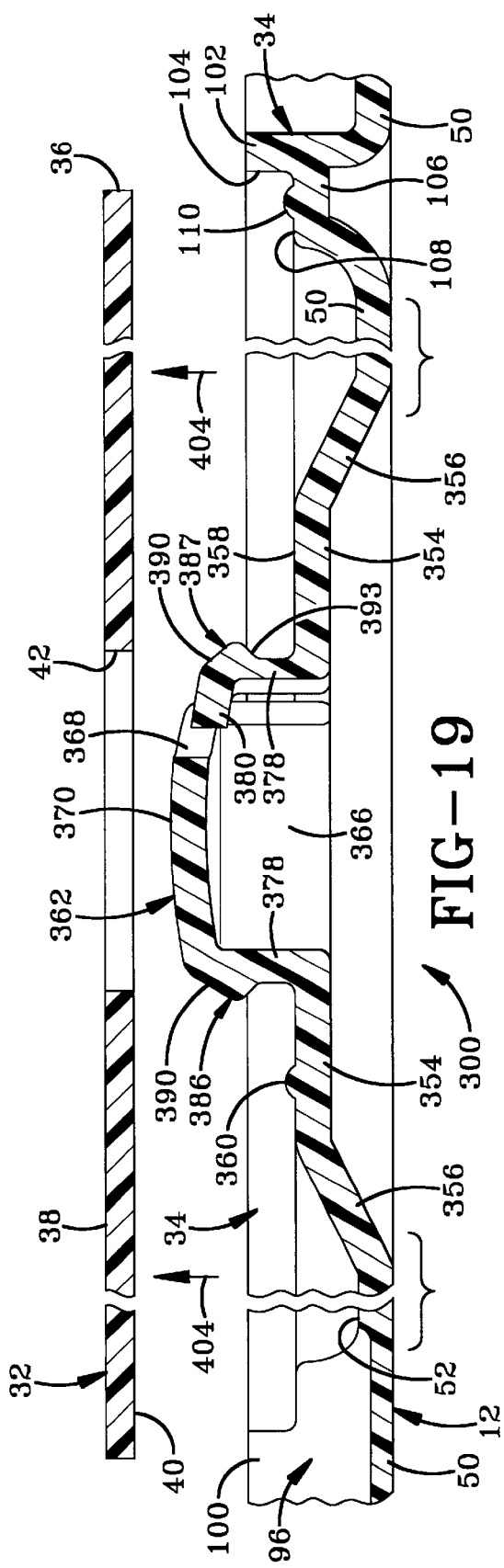

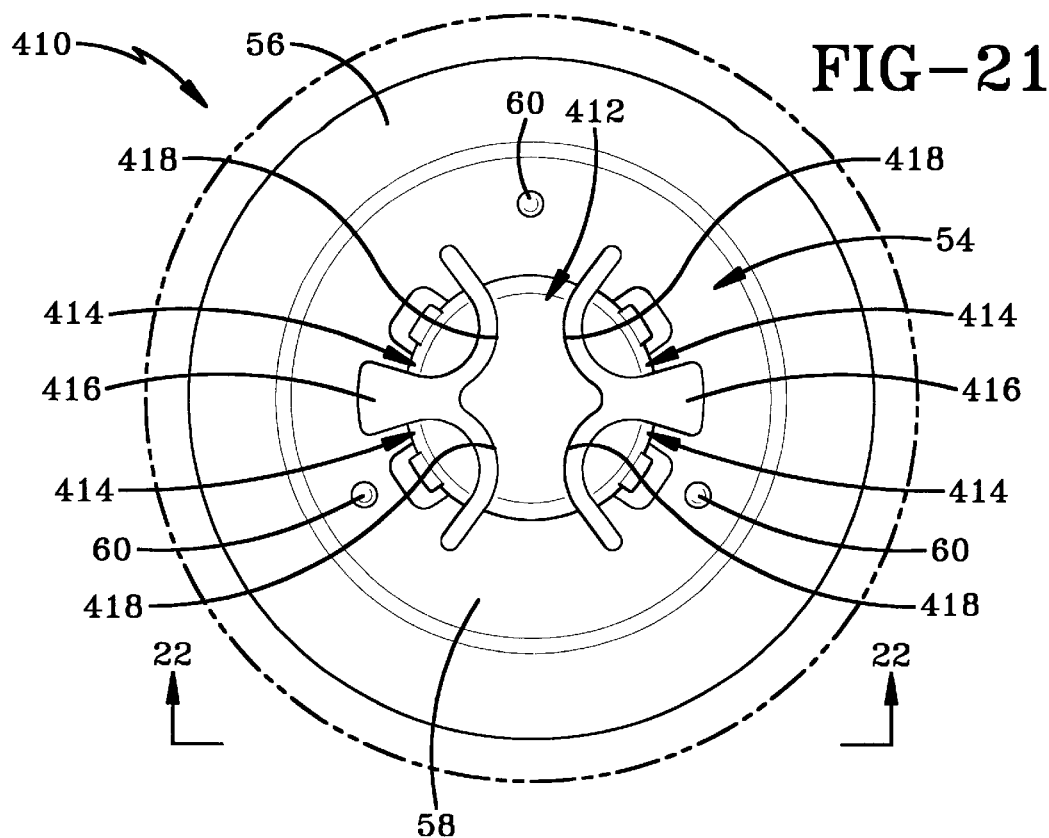
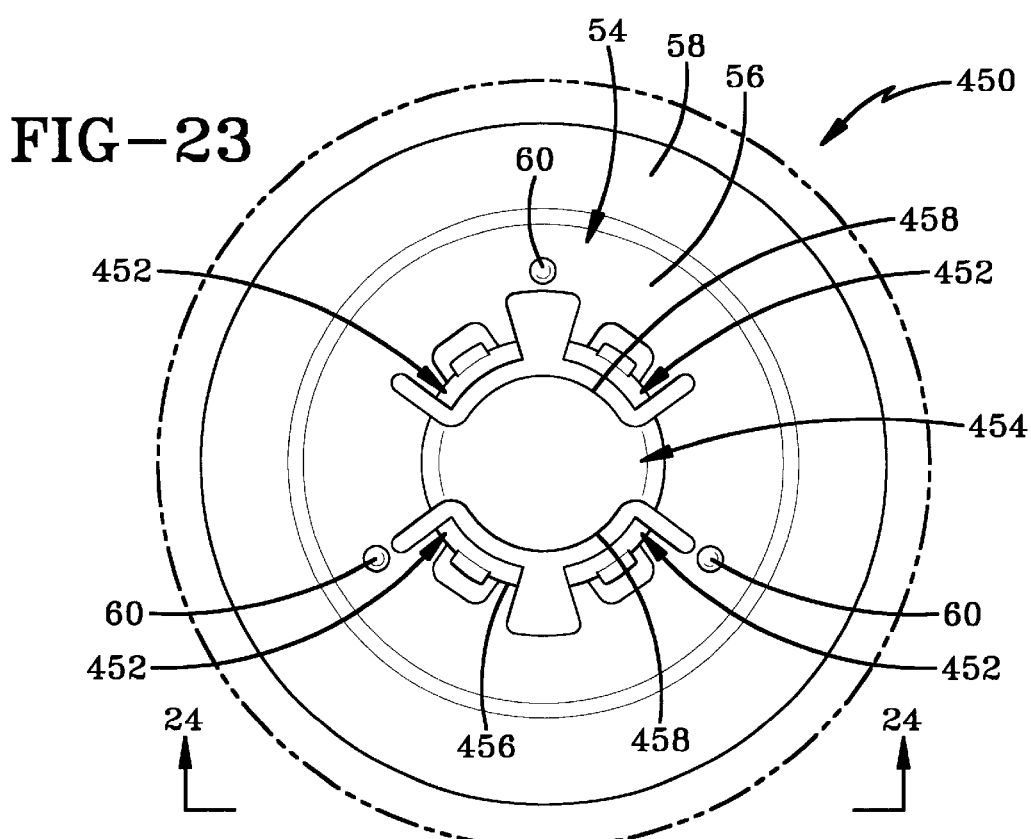

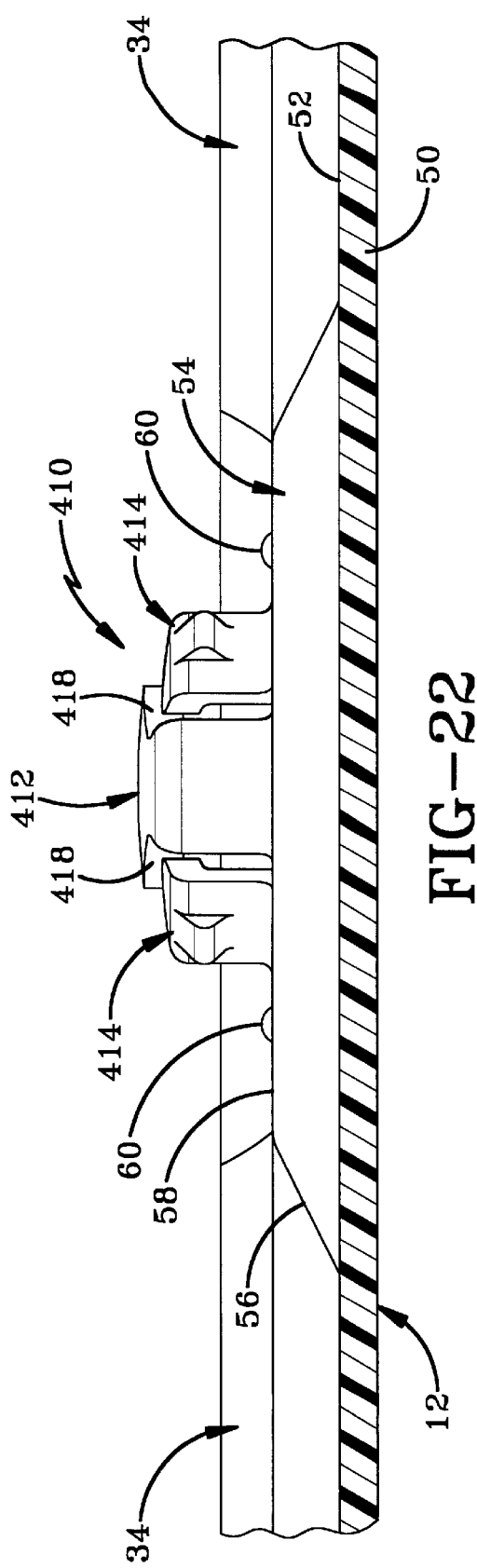
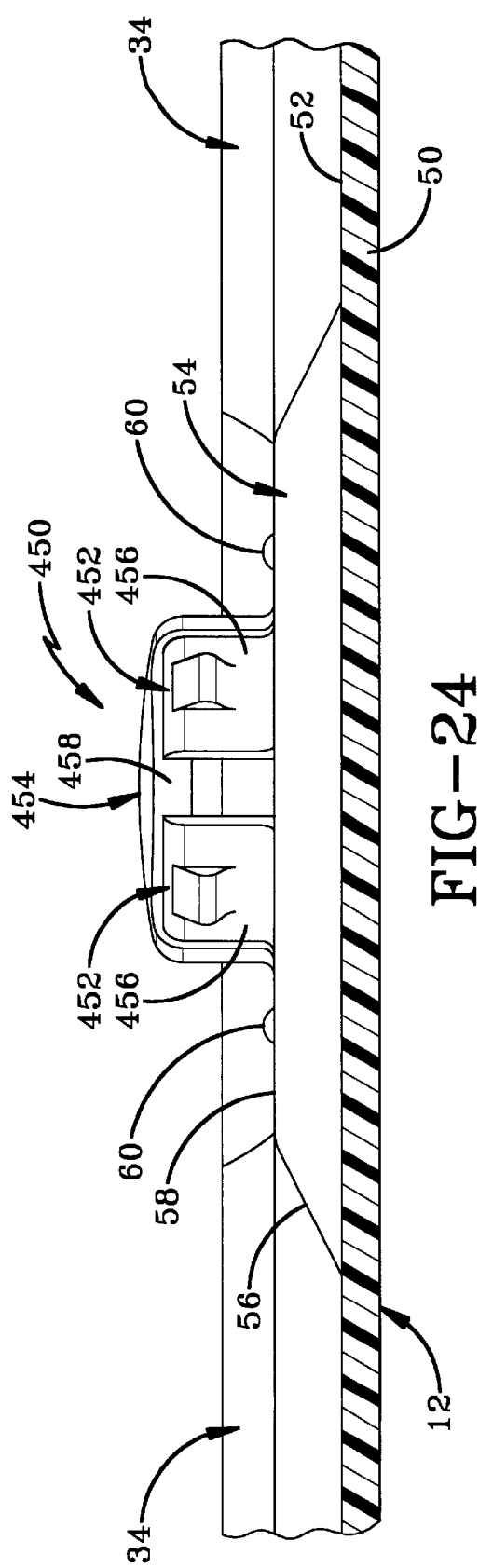

STORAGE CONTAINER FOR RECORDED MEDIA

CROSS-REFERENCE TO RELATED APPLICATIONS

This application is a continuation-in-part Ser. No. 09/245,944 filed on Feb. 5, 1999 application of U.S. Pat. No. 6,065,594, which is a continuation-in-part application Ser. No. 09/108,635 filed on Jul. 1, 1998 of U.S. Pat. No. 5,996,788, which claimed priority from U.S. Provisional Application Ser. No. 60/080,363 filed Apr. 1, 1998, the disclosures of which are incorporated herein by reference.

BACKGROUND OF THE INVENTION

TECHNICAL FIELD

This invention relates generally to storage containers for recorded media and, more particularly, to a storage container having a centrally disposed hub that engages and selectively retains an item of recorded media. Specifically, the present invention is directed to a storage container for recorded media employing a hub that releasably secures an item of recorded media such as a compact disc or DVD while substantially preventing the compact disc or DVD from experiencing bending stresses while the item of recorded media is stored in the storage container.

BACKGROUND INFORMATION

In recent times, most recorded music is purchased by the consumer either on a cassette tape or a compact disc. Cassettes tapes and compact discs have supplanted vinyl records and 8-track tapes as the dominant forms of recorded music. Along with the growth of compact discs, numerous storage containers have been developed to hold the discs during shipping, display for sale, and subsequent home storage of the discs. A disc may spend over 99% of its life stored in one such storage container because the same storage container is typically used to ship the disc, to display the disc, and to store the disc at the home of the consumer. Most of the storage containers known in the art hold the compact disc on a hub that engages the center hole of the disc to hold the disc in place in the storage container.

Digital versatile discs (DVDs) have recently been developed and are expected to grow as more consumers are exposed to the benefits of a digital video picture combined with a digital audio track on a single DVD. DVDs also have a larger storage capacity than a compact disc and may be used to hold feature length films as well as multiple music recordings. It is likely that DVDs may also be used to hold data in computer readable forms. One problem with DVDs is that they currently trade durability for their increased storage capacity. It is believed that a DVD may be damaged over time by the forces that are commonly created in a compact disc storage container. These forces are the outwardly directed forces created by the hub that typically radially engages the interior wall that forms the center hole in a disc. Compact discs are durable enough to be insensitive to this force but it is believed that a DVD will eventually warp as a result of these constant radial forces. Such warping can prevent the data on a DVD from being correctly read by a DVD player.

In view of the perceived problems with the constant bending forces, the industry has moved in the direction of requiring all DVD storage containers to loosely retain the DVD such that it may freely rotate while securely retained by the storage container. The storage container thus must retain the DVD in a manner that allows it to freely rotate while also securely holding the DVD during a standard drop test. It is thus desired in the art to provide a storage container for a DVD that holds the DVD without creating constant bending stresses in the DVD while securely retaining the DVD to prevent it from coming loose.

Another problem with existing storage containers that allow compact discs and DVDs to be easily removed from a hub is that some of these devices create large bending forces in the discs when the disc is removed from the hub. These storage containers typically allow a person to grasp the edge of the disc at any location about its perimeter and pull upwardly causing the disc to engage the hub, compress a portion of the hub, and then pop off of the hub. Although these discs certainly allow for easy removal, the stresses experienced by the disc during the removal process are thought to be large enough to damage a DVD. It is thus desired in the art to provide a storage container for a DVD that allows the DVD to be quickly and easily removed without creating significantly large bending stresses in the DVD during the removal process.

SUMMARY OF THE INVENTION

In view of the foregoing, it is an objective of the present invention to provide a storage container for an item of recorded media that allows the item of recorded media to be easily removed from the storage container.

Another objective of the present invention is to provide a storage container for an item of recorded media that is particularly suited to storing a DVD.

Yet another objective of the present invention is to provide a storage container for an item of recorded media that securely retains the item of recorded media while not subjecting the item to constant bending stresses during storage.

Still another objective of the present invention is to provide a storage container for an item of recorded media that allows the item of recorded media to be easily removed from the storage container without subjecting the item to substantial bending forces.

A further objective of the present invention is to provide a storage container for an item of recorded media that prevents the improper removal of the item of recorded media from the storage container.

Yet a further objective of the present invention is to provide a storage container for an item of recorded media that allows the item of recorded media to freely rotate within the storage container while being stored in the storage container.

Still a further objective of the present invention is to provide a storage container for an item of recorded media that allows an item of recorded media to be removed from the storage container without damaging the media when a user grasps the edge of the media and pulls upwardly.

Yet a further objective of the present invention is to provide a storage container for an item of recorded media that supports the item of recorded media at its center and periphery to prevent it from experiencing stresses when it is stored.

An additional objective of the present invention is to provide a storage container for an item of recorded media that securely stores the media on a centrally-disposed hub that prevent the media from falling off of the hub during the standard industry drop test.

Still an additional objective of the present invention is to provide a storage container for an item of recorded media having at least a centrally-disposed storage hub that may be formed as an integral one-piece part.

Still an additional objective of the present invention is to provide a storage container for an item of recorded media that allows the item of recorded media to be removed from the storage container with a one-handed operation.

Another objective of the present invention is to provide a storage container for an item of recorded media having inner and outer supports that do not engage the information-containing area of the item of recorded media.

Another objective of the present invention is to provide a storage container for an item of recorded media having a plurality of raised bumps that solely support the item of recorded media from below to reduce friction between the storage container and the item of recorded media allowing the item of recorded media to rotate or spin with essentially no friction while in the storage position.

Another objective of the present invention is to provide a storage container for an item of recorded media that includes a hub that has a portion that may be manually moved out of engagement with the item of recorded media while the item of recorded media is being removed from the storage container.

Another objective of the present invention is to provide a storage container for an item of recorded media that includes a rib projecting from the back wall of the storage container that helps retain the item of recorded media in the storage container when the storage container is closed and separates a literature held in the storage container from the item of recorded media.

A further objective of the present invention is to provide a storage container for recorded media that includes only a single finger access hole that is aligned with the resilient arms of the hub such that the item of recorded media may not be improperly removed from the hub.

Another objective of the present invention is to provide a storage container for an item of recorded media that is of a simple construction, that achieves the stated objectives in a simple, effective, and inexpensive manner, and that solves the problems and that satisfies the needs existing in the art.

The present invention thus provides a storage container having a hub with at least three upstanding arms surrounding a fixed body. The fixed body has an upper surface disposed higher above the base than each of the arms.

The invention also provides a storage container for an item of recorded media having a hub with a fixed body and at least three arms. The fixed body includes insets that receive at least a portion of each of the arms.

The invention also provides a storage container for recorded media having a locking tab disposed on the hinge wall in combination with a hub having upstanding walls and a fixed body.

BRIEF DESCRIPTION OF THE DRAWINGS

The preferred embodiments of the invention, illustrative of the best mode in which applicants have contemplated applying the principles of the invention, are set forth in the following description and are shown in the drawings and are particularly and distinctly pointed out and set forth in the appended claims.

FIG. 1 is a top plan view of a storage container for an item of recorded media depicted in an open position;

FIG. 2 is an enlarged top plan view of the hub encircled by the line labeled FIG. 2 in FIG. 1;

FIG. 3 is an enlarged sectional view taken along line 3—3 of FIG. 1;

FIG. 5 is a fragmentary sectional view of the storage container with an item of recorded media disposed above the hub prior to engaging the hub, the hub being in a resting position;

FIG. 6 is a view similar to FIG. 5 with the item of recorded media initially engaging the hub;

FIG. 7 is a view similar to FIG. 5 depicting the item of recorded media fully engaging the hub while it is being installed on the hub;

FIG. 8 is a view similar to FIG. 5 with the item of recorded media in the storage position on the hub;

FIG. 9 is a view similar to FIG. 5 depicting the item of recorded media being removed from the hub;

FIG. 10 is a view similar to FIG. 5 depicting the item of recorded media having been fully removed from the hub;

FIG. 14 is an enlarged top plan view of the third alternative embodiment of the hub that is encircled by the line labeled FIG. 14 in FIG. 13;

FIG. 15 is a sectional view taken along line 15—15 of FIG. 13;

FIG. 16 is a fragmentary sectional view of the storage container with an item of recorded media disposed on th e hub in the storage position;

FIG. 17 is a view similar to FIG. 16 depicting the item of recorded media being removed from the hub;

FIG. 18 is a view similar to FIG. 16 depicting the item of recorded media being released from the hub;

FIG. 19 is a view similar to FIG. 16 depicting the item of recorded media fully removed from the hub;

FIG. 21 is a top plan view of a fourth alternative embodiment of the present invention;

FIG. 22 is a view taken along line 22—22 of FIG. 21;

FIG. 23 is a top plan view of a fifth alternative embodiment of the present invention; and FIG. 24 is a view taken along line 24—24 of FIG. 23.

Similar numerals refer to similar parts throughout the specification.

DESCRIPTION OF THE PREFERRED EMBODIMENT

Figure 20:
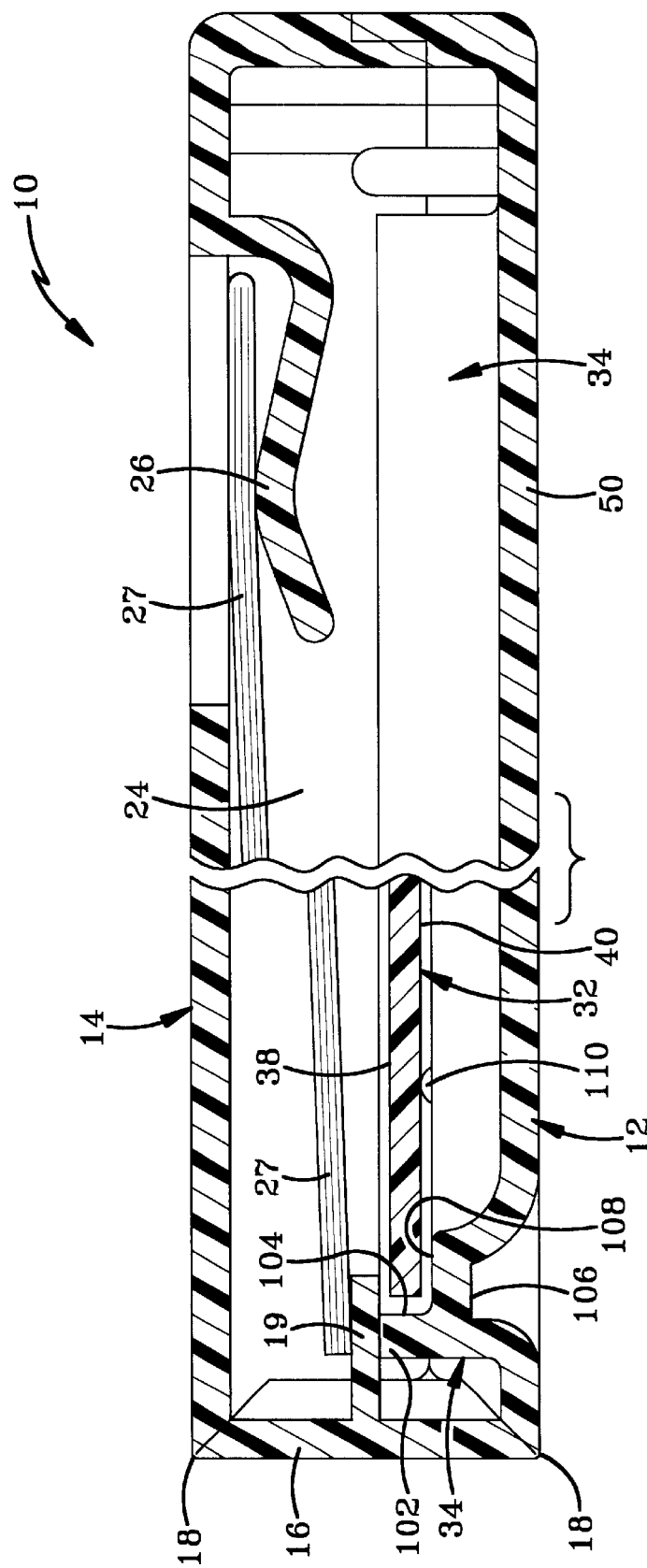
FIG. 20 is a sectional view taken through two different parts of the storage container of the present invention when the storage container is closed showing the relationship between the item of recorded media, the rib projecting from the back wall, and the literature held by the storage container.

The storage container for recorded media according to the present invention is depicted in the accompanying drawings and is indicated generally by the numeral 10. Storage container 10 includes a base, indicated generally by the numeral 12, that is hingedly attached to a lid 14. In the embodiment of the present invention depicted in the drawings, the hinged connection between base 12 and lid 14 is formed by a back wall 16 and a pair of continuous living hinges 18. A rib 19 projects outwardly from back wall 16 and is substantially perpendicular to back wall 16. Rib 19 is configured to extend over the item of recorded media to help retain the item when storage container 10 is closed. Base 12 includes a sidewall 20 that extends about three sides of base 12 attached to living hinge 18. Sidewall 20 includes a plurality of reinforcing ribs 22. Lid 14 may also have a sidewall 24 that extends about the three sides of lid 14 not connected to living hinge 18. Sidewall 24 may have latches that keep container 10 closed. Lid 14 may also include a pair of clips 26 that may be used to hold printed material 27 (see FIG. 20) that describes the material on the item of recorded media stored in storage container 10. Printed material 27 is carried by clips 26 and rib 19 as shown in FIG. 20. Storage container 10 may be fabricated from any of a wide variety of materials but it is preferred that it be fabricated from a plastic strong enough to resist breaking when dropped during a drop test.

In accordance with the objectives of the present invention, storage container 10 includes a hub 30 that is configured and adapted to selectively receive an item of recorded media 32 in a secure manner while allowing item 32 to rotate freely on hub 30 within storage container 10. Hub 30 also allows item 32 to be quickly and easily removed from hub 30 while not creating excessive bending stresses in item 32. Storage container 10 also includes an outer wall 34 that is spaced from hub 30 but fully surrounds hub 30. Outer wall 34 is configured and adapted to prevent a user from improperly removing item 32 of recorded media from storage container 10. Outer wall 34 also cooperates with hub 30 to prevent item 32 from experiencing excessive bending stresses when item 32 is placed into storage container 10. Outer wall 34 further cooperates with hub 30 to allow item 32 to freely rotate while in the stored position while experiencing minimal friction. Outer wall 34 also functions to allow item 32 to be easily removed from storage container 10. Outer wall 34 further protects item 32.

Item of recorded media 32 is in the form of a disc in the preferred embodiment of the present invention. Item 32 may be a typical compact disc or DVD which each have an outer diameter defined by the substantially circular outer edge or wall 36 of item 32. Item 32 also includes an upper surface 38 and a lower surface 40 that are both substantially planar. The distance between upper surface 38 and lower surface 40 of item 32 defines the thickness of item 32. Item 32 further includes an inner wall 42 that is substantially circular and defines an inner hole 44 that has a hole diameter. As is known in the art, the machine-readable information stored on item of recorded media 32 extends from a location adjacent to but spaced from outer edge 36 of item 32 across a middle area 45 to an area adjacent to but spaced from inner wall 42 of item 32 (see FIG. 5). The information is typically spaced farther from inner wall 42 than outer edge 36 such that an inner area 46 surrounding inner wall 42 does not contain machine-readable information whereby that area may be used to hold item of recorded media 32 while it is being played in an appropriate machine.

Base 12 of storage container 10 includes a bottom wall 50 that is substantially planar and includes an upper surface 52. Hub 30 extends up from bottom wall 50. Hub 30 includes a first support platform 54 that is carried above bottom wall 50 of base 12 by an annular spacing wall 56. In the preferred embodiment of the present invention, annular spacing wall 56 is sloped between first support platform 54 and bottom wall 50. In other embodiments of the present invention, annular spacing wall 56 may be perpendicular to both bottom wall 50 and first support platform 54. In still other embodiments of the present invention, annular spacing wall 56 may not be continuous about the entire periphery of first support platform 54.

The upper surface 58 of first support platform 54 is spaced above upper surface 52 of bottom wall 50 so as to provide a space or gap under lower surface 40 of item 32 when item 32 is in the stored position in storage container 10 as depicted in FIG. 8. This gap prevents item 32 from experiencing any friction in the area of item 32 that is disposed above upper surface 52 when item 32 is in the storage position. Annular spacing wall 56 is also configured to place item 32 at a level with respect to bottom wall 50 such that a user can fit at least a portion of a finger or thumb below lower surface 40 of item 32 and upper surface 52 of bottom wall 50 to remove item 32 from storage container 10. Annular spacing wall 56 further provides strength to base 12 by providing a protuberance in the middle portion of base 12 that adds rigidity to storage container 10.

First support platform 54 is substantially circular and provides a lower support to item 32 when item 32 is in the storage position as depicted in FIG. 8. Specifically, a plurality of bumps 60 extend upward from upper surface 58 of first support platform 54 to provide essentially frictionless support to item 32. In the preferred embodiment of the present invention, three bumps 60 are disposed equally about first support platform 54 such that their support is evenly distributed to item 32. Other numbers of bumps 60 may be used in other embodiments of the present invention. Each bump 60 is preferably rounded such that minimal contact between bumps 60 and item 32 is provided. The minimal contact creates essentially no friction between bumps 60 and item 32 when item 32 is in the storage position. The reduced friction is important because item 32 is permitted to freely rotate on hub 30 while in the storage position. In other embodiments of the present invention, bumps 60 may be formed in other shapes that perform the same functions as rounded bumps 60. Bumps 60 are disposed sufficiently inwardly on first support platform 54 so as not to contact the areas of recorded information on item of recorded media 32.

Hub 30 further includes a substantially stable, non-movable body 62 that extends up from first support platform 54 and a pair of resilient arms 64 that are each cantilevered from first support platform 54. Body 62 includes a sidewall 66 that is substantially annular about its circumference with the exception of being broken by a pair of inset curves 68 that define areas that are configured to at least partially receive resilient arms 64 as shown in FIG. 2. Body 62 further includes an upper wall 70 that vaults sidewall 66.

In accordance with one of the objectives of the present invention, body 62 is adapted and configured to prevent the user from manipulating or damaging resilient arms 64 when the user pushes down on hub 30. Such protection is accomplished by configuring body 62 to be substantially taller than each resilient arm 64. As such, upper wall 70 of body 62 is disposed at a height that is larger than the tallest height of each resilient arm 64. The relative heights may be seen in FIG. 5. In the embodiment of the invention depicted in the drawings, each arm 64 is short enough to flex inward and fit under upper wall 70 of body 62. This characteristic prevents a user's finger or thumb from contacting resilient arms 64 when the user presses the center of body 62 with the finger or thumb. As described in the Background of the Invention section above, some prior art devices function by having the user depress the center of the hub of the storage container.

Hub 30 of storage container 10 functions by preventing any action from occurring when the center (upper wall 70 of body 62) of hub 30 is pushed on by the user. Such force is transmitted from upper wall 70 through sidewall 66 to first support platform 54 into annular spacing wall 56 to bottom wall 50 of base 12. The force applied by a user is thus not transmitted into resilient arms 64 causing them to release item 32.

Each resilient arm 64 is separated from body 62 by a slot 72 that extends from first support platform 54 up next to sidewall 66, adjacent upper wall 70, back down next to sidewall 66, and then out into first support platform 54. As may be perhaps best seen in FIG. 2, slots 72 do not extend radially from body 62. The portion of each slot 72 that is formed in first support platform 54 forms an angle with a reference line that passes through a diameter of body 62. The configuration of slots 72 thus allows each resilient arm 64 to be easily deflected by reducing the amount of material supporting each arm 64.

Each resilient arm 64 includes a pair of substantially horizontal support beams 74 that extend between slot 72 and an opening 76 that is formed in first support platform 54 adjacent each resilient arm 64. The sizing and configuration of opening 76 and slot 72 causes each horizontal support beam 74 to be thin such that resilient arm 64 may be easily deflected inward toward the center of hub 30 upon application of a small force. Such easy deflection is important when an item of recorded media such as a DVD is stored in storage container 10 because it is desirable to minimize the bending forces experienced by the recorded media when it is inserted into and removed from storage container 10. Each horizontal support beam 74 is tapered such that it's thin end connects with a vertical leg 78 of resilient arms 64. The thin ends of each support beam 74 function as bending structural members that allow vertical leg 78 to flex inwardly easily. The thicker end of horizontal support beam 74 merges with first support platform 54 and provides the cantilevered support for each resilient arm 64.

Figure 4:
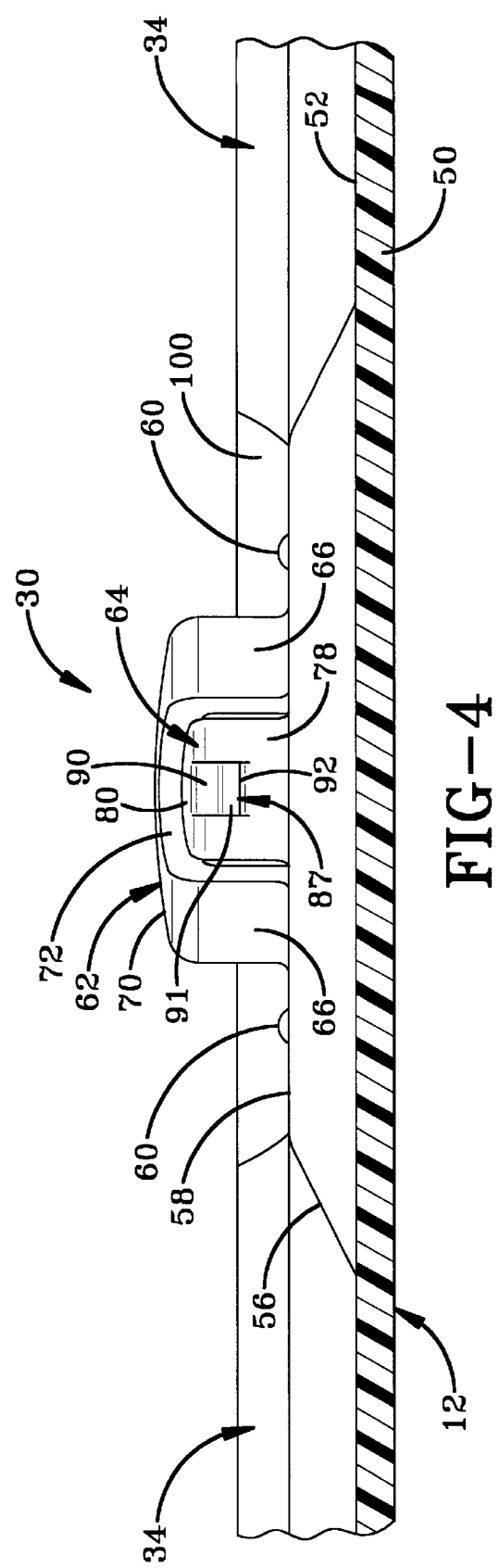
FIG. 4 is an enlarged side view of the hub taken along line 4—4 of FIG. 1.

As may be seen in FIG. 4, vertical leg 78 of resilient arm 64 extends up from the inner end of horizontal support beam 74 to a location that is below the upper surface of sidewall 66 of body 62. An upper arm wall 80 extends radially inward from the upper end of vertical leg 78 such that slot 72 has a relatively constant dimension throughout its length. In the preferred embodiment of the present invention, upper arm wall 80 has a curved inner surface that is complementary to inset curves 68 of body 66. Upper arm wall 80 is also disposed below upper wall 70 of body 62. As discussed above, this configuration prevents the user from readily contacting upper arm wall 80 of resilient arm 64 when the user exerts force on body 62.

In accordance with another object of the present invention, the outwardly facing surface of each vertical leg 78 form a diameter, indicated by the dimension line labeled with the numeral 82, that is larger than the outer diameter of sidewalls 66 that is indicated by the dimension line labeled with the numeral 84. Each diameter 82 and 84 is, however, smaller than the hole diameter of item 32 such that inner wall 42 of item 32 may not contact both sides of sidewall 66 or both vertical legs 78 when item 32 is in the storage position. The configuration ensures that inner wall 42 will only contact one vertical leg 78 at a time. These dimensions allow item 32 to freely rotate on hub 30 when item 32 is securely retained on hub 30 by body 62 and resilient arms 64. The larger diameter 82 of vertical legs 78 ensures that item 32 will initially contact arms 64 when removed from container 10 instead of contacting fixed body 62.

In accordance with another objective of the present invention, detents 86 and 87 project from vertical legs 78 of resilient arms 64. Detents 86 and 87 are configured to cooperate to have a diameter, indicated by the dimension line labeled by the numeral 88 in FIG. 8, that is larger than the hole diameter of item 32. Each detent 86 and 87 is disposed above item 32 when item 32 is in the storage position. Detents 86 and 87 thus cooperate to retain item 32 on hub 30 when item 32 is in the storage position as depicted in FIG. 8.

Detents 86 and 87 are shaped differently as may be seen in FIG. 5. Each detent 86 and 87 includes an upper taper 90 that is sized and configured to engage the lower edge of inner wall 42 of item 32 when item 32 is placed over hub 30 as shown in FIG. 6. Upper taper 90 thus extends down from the top surface of upper arm wall 80. Detents 86 and 87 are otherwise differently configured so as to function to hold item 32 in storage container 10 and to allow item 32 to be removed from storage container 10 without experiencing damaging bending forces.

One of detents 87 is a locking detent that is designed to hold item 32 in its storage position and to not interfere with the removal of item 32 from hub 30. Locking detent 87 is disposed on the arm 64 that is opposite the finger access hole 96 (discussed in more detail below) that is disposed in outer wall 34. Locking detent 87 includes a substantially vertical outer face 91 and an undercut wall 92 that is substantially parallel to upper surface 58 of first support platform 54. In other embodiments of the present invention, undercut wall 92 need not be horizontal and may form a smooth curve between the bottom of outer face 91 and the top of vertical leg 78. Undercut wall may also be angled with respect to horizontal. Vertical outer face 91 and undercut wall 92 are sized and configured to be disposed above a portion of item 32 when item 32 is in the storage position. Undercut wall 92 provides a strong retaining force to item 32 due to its angle with respect to item 32 when an outside force results in item 32 be forced up away from first support platform 54. Such forces occur when storage container 10 is turned upside down or when storage container 10 is dropped during a drop test or by accident.

The other detent 86 that is adjacent finger access hole 96 is the unlocking detent because it is acted on by item 32 to release item 32 from storage container 10 when the correct type of force is transmitted to item 32. Unlocking detent 86 is a dual-tapered detent that has a lower taper 93. Lower taper 93 may connect directly to upper taper 90 or may be connected by a smooth curve 94 as depicted in the drawings. Unlocking detent 86 is configured to allow item 32 to contact lower taper 93 and force unlocking detent 86 and its resilient arm 64 inwardly when item 32 is being removed from container 10 by a user. Although lower taper 93 provides a retaining force to item 32 because it is disposed above item 32, lower taper 32 is angled more steeply with respect to item 32 than undercut wall 92 is angled with respect to item 32 such that item 32 may slide over lower taper 93 more easily than undercut wall 92.

As noted above, storage container 10 includes outer wall 34 in addition to hub 30. In accordance with another objective of the present invention, outer wall 34 only allows the user to access item of recorded media 32 in a single, predetermined location that is specifically designed to transfer force from item 32 to resilient arms 64. Outer wall 34 thus ensures that the user of storage container 10 will remove item of recorded media 32 in the proper manner whereby any harmful bending stresses in item of recorded media 32 are minimized. Outer wall 34 achieves this limitation by blocking access to item of recorded media 32 by the user about all of the perimeter of item of recorded media 32 but for a single finger access hole 96.

As may be seen in FIG. 3, finger access hole 96 has a lower surface 98 that is disposed below upper surface 52 of bottom wall 50. The location of lower surface 98 provides extra room for the user to grasp item 32 when item 32 is in the storage position depicted in FIG. 8. The sidewall 100 of finger access hole 96 is dished so as to provide a smooth transition and entrance for the finger or thumb of the user. Finger access hole 96 is aligned with resilient arms 64 such that a reference line 101 that bisects each resilient arm 64 also bisects finger access hole 96. This arrangement causes the user to exert force on item 32 in a direction that causes the force to be directly transferred to resilient arms 64 such that at least one arm 64 will immediately deflect and start to release item 32. The thinness of support beams 74 also assists in the immediate reaction in arms 64. The provision of only a single finger access hole 96 also forces the user to properly remove item 30 from container 10. Some prior art storage containers allow the user to grasp the disc on either side of a hub thus squeezing and bending the disc. The provision of a pair of finger access holes also allows the user to choose which side of the disc to initially pick up. The present invention eliminates such choice by only providing the single finger access hole 96. These configurations and arrangements reduce the amount of undesirable bending forces being experienced in item 32 during removal of item 32 from storage container 10.

Aside from finger access hole 96, outer wall 34 extends entirely about the outer periphery of item 32 to prevent the user from grasping outer edge 36 of item 32 when item 32 is in the storage position. In accordance with another objective of the present invention, outer wall 34 includes a blocking wall 102 that extends upwardly from bottom wall 50 of storage container 10. Blocking wall 102 is substantially perpendicular to bottom wall 50 and extends to a height that is above upper surface 38 of item 32 when item 32 is in the storage position. Blocking wall 102 has an inner surface 104 that has an inner diameter that is greater than the outer diameter of item 32 such that item 32 does not contact any portion of blocking wall 102 when item 32 is in the storage position. Such a configuration also provides no friction between blocking wall 102 and item 32 when item 32 is free to rotate on hub 30. Blocking wall 102 further protects outer wall 36 of item 32.

Outerwall 34 further includes a second support platform 106 that extends entirely about outer wall 34 except for the area where finger access hole 96 interrupts outer wall 34. Second support platform 106 has an upper surface 108 that is at substantially the same height and substantially planar with upper surface 58 of first support platform 54. Outer wall 34 further includes a plurality of bumps 110 that project upwardly from second support platform 106. Each bump 110 is substantially similar to bumps 60 disposed on first support platform is 54 such that bumps 110 and bumps 60 are substantially at the same height. Bumps 110 are also preferably rounded to provide minimal friction between item 32 and bumps 110. In the preferred embodiment of the present invention, three bumps 110 are equally dispersed about outer wall 34. Bumps 110 are oppositely disposed with respect to bumps 60. Bumps 110 and 60 thus cooperate to support item of recorded media 32 in a substantially frictionless manner such that item 32 may rotate freely on hub 30 while in the storage position. A different number of bumps may be used in other embodiments of the present invention.

The operation of storage container 10 is depicted in FIGS. 5–10. In FIG. 5, item of recorded media 32 is completely removed from storage container 10. Item of recorded media 32 is placed on storage container 10 by first positioning item of recorded media 32 above hub 30 such that inner hole 44 of item 32 is substantially aligned with body 62 and resilient arms 64. The user then places item 32 into contact with detents 86 and 87 on resilient arms 64. This position is depicted in FIG. 6. The user then applies substantially even force as indicated by the arrows labeled with numeral 112. Force 112 is transmitted by item 32 to detents 86 and 87 and particularly upper taper 90 of detents 86 and 87. The force on upper tapers 90 causes each resilient arm 64 to flex inwardly as depicted in FIG. 7. The movement of each resilient arm is indicated by the arrow labeled with the numeral 114. The user maintains force 112 until item 32 gently snaps over detents 86 and 87 to the storage position as depicted in FIG. 8. The force that is required to deflect each arm 64 inwardly is small and not large enough to cause damage to a recorded media. Arms 64 deflect inwardly easily due to the dimensions of support beams 74.

Once item 32 is below detents 86 and 87, resilient arms 64 flex back outwardly to their resting position. As described above, the outer surface of each resilient arm 64 does not contact innerwall 42 of item 32 in tandem. In this position, item 32 is supported from below by bumps 60 and 110 while being supported from above by lower taper 93 and undercut wall 92. Undercut wall 92 and lower taper 93 are sized to be large enough to prevent item 32 from falling off hub 30 during the industry drop test that is performed on storage container 10.

Item 32 does not contact any portion of blocking wall 102. Item 32 is thus free to rotate and is only loosely held by storage container 10. Item 32 thus is free from damaging bending stresses that can harm item 32 when it is stored for an extended period of time in a storage container. The supporting forces provided by bumps 60 and 110 prevent item 32 from experiencing damaging bending stresses if the user applies additional downward force on item once it is in the storage position. Item 32 is thus supported at its inner portion and at its outer portion when it is in the storage position. Furthermore, if the user attempts to push the center of hub 30 to release item 32 from its storage position, upper wall 70 of body 62 remains stable and prevents the user from accidentally manipulating or damaging resilient arms 64. When item 32 is in the storage position on hub 30, storage container 10 may be closed by bending lid 14 over base 12 at hinges 18 to move back wall 16 in an orientation where it is substantially perpendicular to lid 14 in base 12. In this position, rib 19 is substantially parallel to lid 14 in base 12 and extends over at least a portion of item 32 as depicted in FIG. 20. Rib 19 thus helps retain item 32 in its storage position. It has been found that rib 19 is especially useful when storage container 10 is dropped and experiences an impact force that can jar item 32 from hub 30.

Item of recorded media 32 is removed from storage container 10 by the user when the user places a finger or a thumb in finger access hole 96 and contacts the edge of item 32 that is disposed in finger access hole 96. The contact between the user's finger or thumb and outer edge 36 of item 32 forces item 32 away from finger access hole 96 such that inner wall 42 is forced against the radial outer surface of leg 78 that is adjacent finger access hole 96. When this occurs, inner wall 42 is pushed away from leg 78 of resilient arm 64 that is opposite finger access hole 96 thus moving item 32 as far out as possible from under undercut wall 92.

The user then applies force in the direction indicated by the arrow labeled by numeral 116 to item 32 causing it to pivot on the bump 110 that is disposed opposite finger access hole 96 on reference line 101. This action is depicted in FIG. 9. Force 116 thus causes item 32 to tilt about its pivot causing inner wall 42 closest to finger access hole 96 to engage lower taper 93 of unlocking detent 86 causing its resilient arm 64 to start to deflect inwardly as indicated by the arrow labeled by numeral 118. Immediately thereafter, item 32 engages undercut wall 92 and forces locking detent inwardly as indicated by the arrow labeled by the numeral 120. The contact between item 32 and undercut wall 92 is not significantly large because item 32 has already been pushed out from under undercut wall 92 when the user's finger or thumb contacted outerwall 36 of item 32 that was disposed in finger access hole 96. The user continues to exert force 116 until item 32 deflects each resilient arm 64 inwardly far enough to allow item of recorded media 32 to pass over detents 86 and 87 and become free from hub 30. The user may then lift item 32 as depicted in FIG. 10 in the direction of the arrows labeled by numeral 122 to remove item of recorded media 32 from storage container 10. Item 32 experiences little damaging bending stresses during removal from hub 30 due to the alignment of finger access hole 96 and arms 64 as well as the thin dimensions of support beams 74. Furthermore, the location of the single finger access hole 96 causes inner wall 42 of item 30 to be forced back into unlocking detent 86 and moved substantially free of locking detent 87 when the user inserts a finger or thumb into finger access hole 96. If the user could grasp both sides of item 30, inner wall 42 would likely be lifted upwardly into both detents 86 and 87 simultaneously preventing item 32 from being easily removed from container 10.

Figure 11:
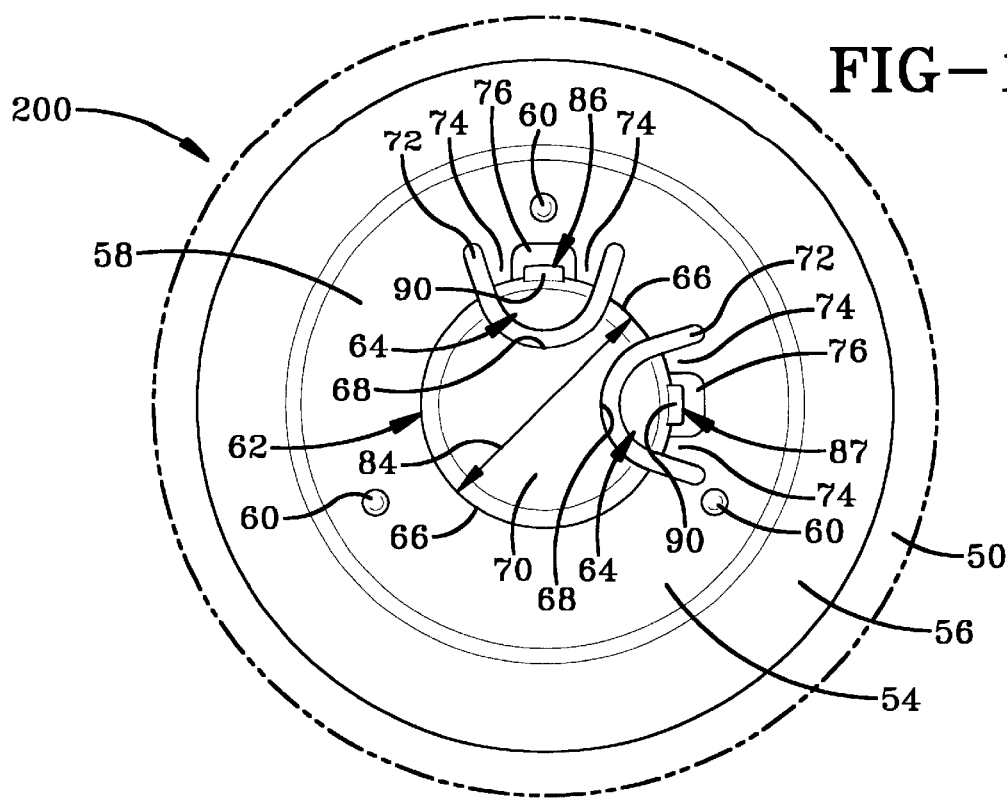
FIG. 11 is a view similar to FIG. 2 showing an enlarged top plan view of a first alternative embodiment of the hub of the present invention.
Figure 12:
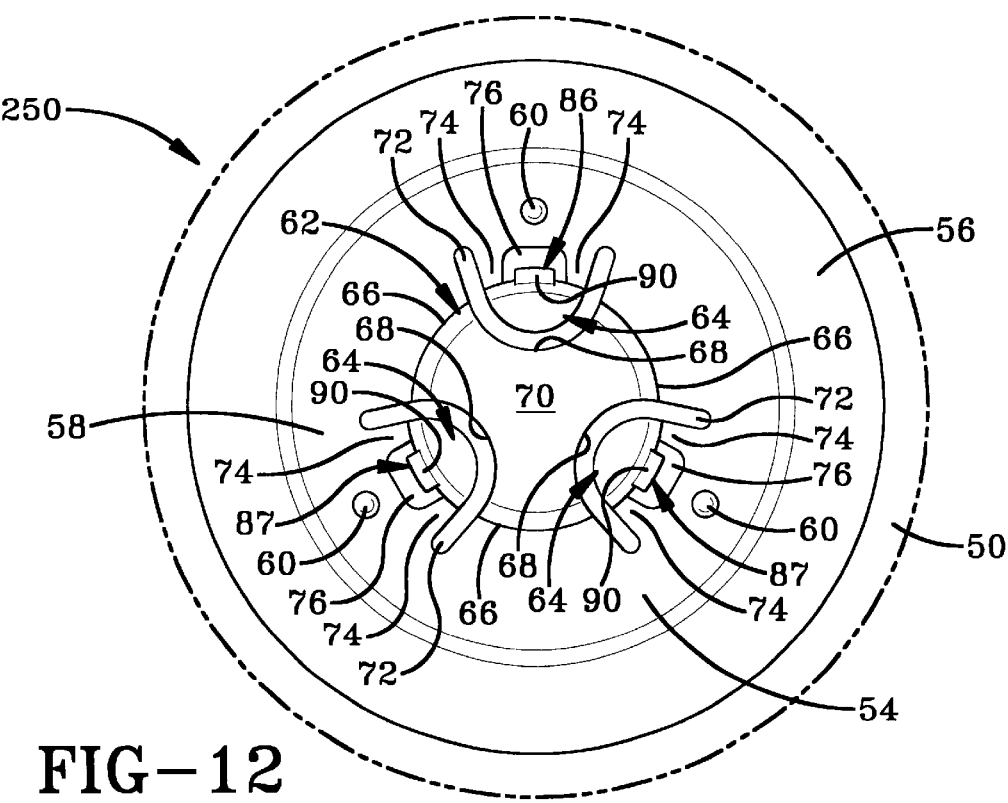
FIG. 12 is a view similar to FIG. 11 showing a second alternative embodiment of the hub of the present invention.
Figure 13:
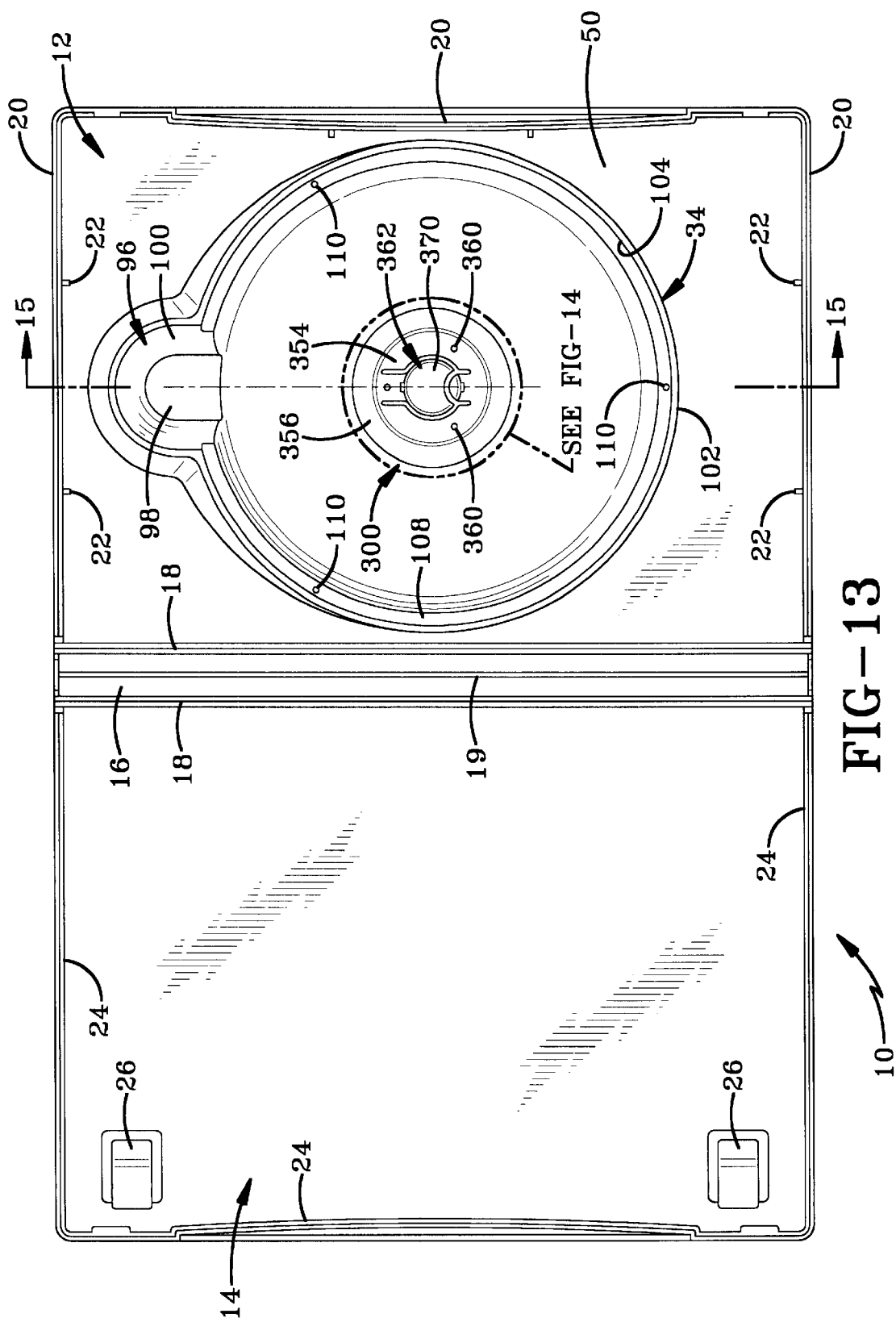
FIG. 13 is a top plan view of a storage container for an item of recorded media depicted an open position having a third alternative embodiment of the hub of the present invention.

A first alternative embodiment of the hub for storage container 10 is depicted in FIG. 11 and is indicated by the numeral 200. Hub 200 includes substantially the same elements as hub 30 described above except that resilient arms 64 are disposed 90 degrees from each other instead of 180 degrees from each other. A second alternative embodiment of the hub for storage container 10 is depicted in FIG. 12 and is indicated by the numeral 250. Hub 250 includes a third arm 64 with arms 64 equally dispersed about body 62. Each hub 200 and 250 functions to retain item 32 in storage container 10 in substantially the same manner as described above in respect to hub 30.

A third alternative embodiment of the hub for storage container 10 of the present invention is depicted in FIGS. 13–19 and is indicated by the numeral 300. Hub 300 is formed in base 12 and has substantially the same relation to base 12, lid 14, back wall 16, and outer wall 34 as hub 30 described above. In view of the similarities, only the specific structure of hub 300 will now be described with it being understood that the structure of outer wall 34, base 12, lid 14, and back wall 16 are substantially as described above.

Base 12 of storage container 10 contains bottom wall 50 that is substantially planar and includes upper surface 52 as described above. Hub 300 extends up from bottom wall 50. Hub 300 includes a first support platform 354 that is carried above bottom wall 50 of base 12 by an annular spacing wall 356. Annular spacing wall 356 may be sloped between first support platform 354 and bottom wall 50. The upper surface 358 of first support platform 354 is spaced above upper surface 52 of bottom wall 50 so as to provide a gap under lower surface 40 of item 32 when item 32 is in the storage position in storage container 10 as depicted in FIG. 16. This gap prevents item 32 from experiencing any friction in the area of item 32 that is disposed above upper surface 52 when item 32 is in the storage position. Annular spacing wall 356 is also configured to place item 32 at a level with respect to bottom wall 50 such that a user can fit at least a portion of a finger or thumb below lower surface 40 of item 32 and upper surface 52 of bottom wall 50 to remove item 32 from storage container 10. Annular spacing wall 356 further provides strength to base 12 by providing a protuberance in the middle portion of base 12 that adds rigidity to storage container 10.

First support platform 354 is substantially circular and provides a lower support to item 32 when item 32 is in the storage position as depicted in FIG. 16. Specifically, a plurality of bumps 360 extend up from upper surface 358 of first support platform 354 to provide essentially friction less support to item 32. In this embodiment of the present invention, three bumps 360 are disposed equally about first support platform 354 such that their support is evenly distributed to item 32. Other numbers of bumps 360 may be used in other embodiments of the present invention. Each bump 360 is preferably rounded to provide minimal contact between bumps 360 and item 32. The minimal contact creates essentially no friction between bumps 360 and item 32 when item 32 is in the storage position. The reduced friction is important because item 32 is permitted to freely rotate on hub 300 while in the storage position. In other embodiments of the present invention, bumps 360 may be formed in other shapes that perform the same functions as rounded bumps 360. Bumps 360 are disposed sufficiently inward on first support platform 354 so as not to contact the areas of recorded information on item 32.

Hub 300 further includes a first resilient arm 362 and a second resilient arm 364 that are each cantilevered from first support platform 354. First resilient arm 362 includes a side wall 366 that is substantially annular about its circumference with the exception of being broken by an inset curve 368 that defines an area that at least partially receives resilient arm 364 as shown in FIG. 14. Arm 362 further includes an upper wall 370 that vaults side wall 366.

In accordance with one of the objectives of the present invention, first resilient arm 362 is adapted and configured to allow the user to depress arm 362 when the user pushes down on top wall 370. Such action allows the user to easily remove item 32 of recorded media from hub 300 with essentially no contact occurring between item 32 and hub 300 that could cause a damaging bending stress from occurring in item 32. To facilitate this movement, upper wall 370 of arm 362 is disposed at a height that is taller than the tallest position of resilient arm 364. The relative heights may be seen in FIG. 16.

Each arm 362 and 364 is cantilevered from first support platform 354 by a substantially horizontal support beam 374 that is defined by a slot 372 that extends around side wall 366 and extends outwardly into first support platform 354. As can be seen in FIG. 14, slot 372 extends farther into platform 354 when defining horizontal support beam 74 that supports first resilient arm 362 than it does when defining beam 74 that supports second resilient arm 364. FIG. 14 shows that slot 372 extends through about a quarter to half of the width of support platform 354 when defining beam 74 that supports arm 364. Slot 372 extends over half of the width of support platform 354 when defining beam 74 that supports arm 362. This configuration allows first resilient arm 362 to be more flexible than second resilient arm 364 and allows arm 362 to be depressed as depicted in FIGS. 17 and 18.

As may be seen in FIG. 16, each resilient arm 362 and 364 includes a vertical leg 378 that extends up from the inner ends of horizontal support beams 374. The upper end of vertical leg 378 of resilient arm 362 connects with top wall 370. The upper end of vertical leg 378 of resilient arm 364 connects with an upper arm wall 380 that extends radially inward toward inset curve 368. Upper arm wall 380 has a curved inner surface that is complimentary to inset curve 368. Upper arm wall 380 is also disposed below top wall 370 of arm 362. This configuration allows the user of storage container 10 having hub 300 to easily contact top surface 370 and depress resilient arm 362.

In accordance with another objective of the present invention, the outwardly facing surface of each vertical leg 378 form a distance, indicated by the dimension line labeled with the numeral 382, that is larger than the outer diameter of side wall 366 that is indicated by the dimension line labeled 384. Each distance 382 and 384 is, however, smaller than the hole diameter of item 32 such that inner wall 42 of item 32 is not permitted to contact both sides of side wall 366 or both vertical legs when item 32 is in the storage position. The configuration ensures that inner wall 42 will only contact one surface at a time. These dimensions allow item 32 to freely rotate on hub 300 when item 32 is securely retained on hub 30 by arms 362 and 364.

In accordance with another objective of the present invention, detents 386 and 387 project from vertical legs 378 of resilient arms 362 and 364. Detents 386 and 387 are configured to cooperate to have a diameter, indicated by the dimension line labeled by the numeral 388 in FIG. 16, that is larger than the hole diameter of item 32. Each detent 386 and 387 is disposed above item 32 when item 32 is in the storage position. Detents 386 and 387 thus cooperate to retain item 32 on hub 300 when item 32 is in the storage position as depicted in FIG. 16.

Detents 386 and 387 may be shaped differently as described above with respect to hub 30 and detents 86 and 87. However, in hub 300, detents 386 and 387 may be substantially the same shape as depicted in FIGS. 16–19. Each detent 386 and 387 is a dual-taped detent having an upper taper 390 and a lower taper 393. Lower taper 393 connects directly with upper taper 390 in a smooth curve as depicted in the drawings.

As described above, storage container 10 includes outer wall 34 in addition to hub 300. In accordance with another objective of the present invention, outer wall 34 only allows the user to access item of recorded media 32 in a single, pre-determined location that is specifically designed to force the user of storage container 10 to remove item 32 in the proper manner thereby minimizing any harmful bending stresses in item 32 during the removal procedure. Outer wall 34 creates this limitation by blocking access to item 32 by the user about all of the perimeter of item 32 but for a single finger access hole 96. The structure of finger access hole 96 and outer wall 34 are described above.

The operation of storage container 10 and hub 300 is depicted in FIGS. 16–19. Item 32 of recorded media is placed on hub 300 in substantially the same manner as described above with respect to hub 30 and as depicted in FIGS. 5–7. Once item 32 has been forced over detents 386 and 387, it rests in the storage position depicted in FIG. 16. The steps of removing item 32 from hub 300 are depicted in FIGS. 16–19. Item of recorded media 32 may be removed from hub 300 and storage container 10 by the user in two different ways. First, item 32 may be removed as described above with respect to hub 30 by simply placing a finger or thumb in finger access hole 96 and lifting the edge of item 32 away from storage container 10. The contact between the user's finger or thumb and outer edge 36 of item 32 forces item 32 away from finger access hole 96 such that inner wall 42 of item 32 is forced against the radial outer surface of leg 378 that is adjacent finger access hole 96. When this occurs, inner wall 42 is pushed away from leg 378 of resilient arm 364 that is opposite finger access hole 96. The user then lifts item 32 and resilient arms 362 and 364 function substantially as resilient arms 64 described above.

The other way of removing item 32 allows item 32 to be removed from hub 300 with essentially no contact between item 32 and hub 300. To remove item 32 in this manner, the user first depresses resilient arm 362 by depressing top wall 370 as indicated by the arrow labeled by numeral 400. The act of depressing resilient arm 362 causes detent 386 to move radially inward allowing the user to lift the edge of item 32 as indicated by the arrow labeled with numeral 402. The user may lift item 32 over detent 386 with essentially no contact, if any, when resilient arm 362 is in the depressed position depicted in FIGS. 17–18. Once inner wall 42 clears detent 386, item 32 moves away from finger access hole 96 such that inner wall 42 also clears detent 387 as depicted in FIG. 18. Item 32 is then lifted away from hub 300 as shown in FIG. 19 and indicated by the arrows labeled with numeral 404. The user then releases the force on top wall 370 and resilient arm 362 moves back to its resting position. Item 32 thus experiences essentially no bending forces while being removed from storage container 10 in this manner.

A fourth alternative embodiment of the hub for storage container 10 of the present invention is depicted in FIGS. 21 and 22 and is indicated generally by the numeral 410. Hub 410 is formed in base 12 and has substantially the same relation to base 12, lid 14, back wall 16, and outer wall 34 as hub 30 described above. In view of the similarities, only the specific structure of hub 410 will now be described with it being understood that the structure of outer wall 34, base 12, lid 14, and back wall 16 are substantially as described above.

Hub 410 includes a fixed body 412 that is connected to base 12 and preferably extends outwardly from first support platform 54. Hub 410 further includes four upstanding arms 414 disposed about fixed body 412. Each arm 414 may have substantially the same construction as arms 64 described above. The slots formed in support platform 54 may merge together as shown at numeral 416. However, fixed body 412 includes insets 418 that receive at least a portion of arms 414.

As shown in FIG. 22, the upper surface of fixed body 412 is disposed higher than the upper surface of each arm 414. This configuration makes it hard for the user to push down on arms 414 because fixed body 412 transfers the force of a user's finger or thumb directly to base 12.

Arms 414 may include detents 86 and 87 as described above or may simply include a plurality of dual tapered detents similar to detents 86 described above.

In the embodiment of the invention depicted in FIG. 22, the longitudinal centerline of fixed body 412 is aligned with finger access hole 96. In another embodiment, the longitudinal centerline of fixed body 412 may be disposed at another angle with respect to finger access hole 96. In embodiment 410 and embodiments 200 and 250, the specific alignment between the arms and the finger access hole is not as important as in embodiment 30.

A fifth embodiment of the hub for storage container 10 of the present invention is depicted in FIGS. 23 and 24 and is indicated generally by the numeral 450. Hub 450 also includes four arms 452 disposed about a fixed body 454.

Arms 452 may include the detents as described above with respect to hub 410. The relative heights of arms 452 and fixed body 454 are also the same as described above with respect to hub 410.

The difference between hub 410 and hub 450 is that each arm 452 lacks the substantially horizontal upper surface. Although each arm 452 has a tapered upper surface, the upper surface of arm 452 does not extend beyond the perimeter of the vertical wall 456 of arm 452.

Fixed body 454 includes two insets 458 that each receive two arms 452. Insets 458 are curved in the opposite direction of insets 418 described above.

Accordingly, the improved storage container for recorded media is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirement of the prior art, because such terms are used for descriptive purpose and are intended to be broadly construed.

Moreover, the description and illustration of the invention is by way of example, and the scope of the invention is not limited to the exact details shown or described.

Having now described the features, discoveries and principles of the invention, the manner in which the improved storage container for recorded media is constructed and used, the characteristics of the construction, and the advantageous, new and useful results obtained, the new and useful structures, devices, elements, arrangements, parts and combinations, are set forth in the appended claims.

What is claimed is:

1. A storage container for releasably securing an item of recorded media having an outer edge defining an outer diameter and an inner edge defining a centrally disposed inner hole having a hole diameter, the storage container comprising:
    a base having an upper surface;
    a hub projecting upward from the upper surface of the base;
    the hub including a fixed body and at least two upstanding arms, the upstanding arms disposed about the fixed body;
    each of the upstanding arms having an upper surface;
    the fixed body having an upper surface;
    the upper surface of the fixed body being disposed higher above the base than the upper surface of the at least one of the arms; and
    the hub including a first support platform having an upper surface, the fixed body and the upstanding arms projecting upward from the upper surface of the support platform.

2. The storage container of claim 1, further comprising an outer wall at least partially surrounding the hub.

3. The storage container of claim 2, wherein the outer wall has a finger access hole.

4. The storage container of claim 2, wherein the outer wall includes a second support platform having an upper surface, the upper surface of the second support platform being no higher than the upper surface of the first support platform; the second support platform adapted to support the outer edge of the item of recorded media.

5. The storage container of claim 2, wherein the outer wall includes a blocking wall adapted to extend higher than the item of recorded media when the item of recorded media is securely received on the hub.

6. The storage container of claim 5, wherein the blocking wall has an inner diameter that is adapted to be larger than the outer diameter of the item of recorded media.

7. A storage container for releasably securing an item of recorded media having an outer edge defining an outer diameter and an inner edge defining a centrally disposed inner hole having a hole diameter, the storage container comprising:
    a base having an upper surface;
    a hub projecting upward from the upper surface of the base;
    the hub including a fixed body and at least two upstanding arms, the upstanding arms disposed about the fixed body;
    each of the upstanding arms having an upper surface;
    the fixed body having an upper surface;
    the upper surface of the fixed body being disposed higher above the base than the upper surface of the at least one of the arms; and
    the body includes a sidewall and an upper wall that vaults the sidewall, the upper wall disposed higher than each of the upstanding arms.

8. The storage container of claim 7, wherein the sidewall has an outer diameter; each of the resilient arms having a vertical leg; the vertical legs cooperating to having an outer diameter; the outer diameter of the vertical legs being greater than the outer diameter of the sidewall; and both of the outer diameters adapted to be less than the hole diameter of the item of recorded media.

9. The storage container of claim 8, further comprising a dual-tapered detent carried by each of the upstanding arms; each of the detents adapted to be positioned over a portion of the upper surface of the item of recorded media when the item of recorded media is disposed on the hub.

10. A storage container for releasably securing an item of recorded media having an outer edge defining an outer diameter and an inner edge defining a centrally disposed inner hole having a hole diameter, the storage container comprising:
    a base having an upper surface;
    a hub projecting upward from the upper surface of the base;
    the hub including a fixed body and at least two upstanding arms, the upstanding arms disposed about the fixed body;
    each of the upstanding arms having an upper surface;
    the fixed body having an upper surface;
    the upper surface of the fixed body being disposed higher above the base than the upper surface of the at least one of the arms; and
    the fixed body includes an inset curve corresponding to each of the upstanding arms; a portion of each upstanding arm being disposed in one of the inset curves.

11. A storage container for releasably securing an item of recorded media having an outer edge defining an outer diameter and an inner edge defining a centrally disposed inner hole having a hole diameter, the storage container comprising:
    a base having an upper surface;
    a hub projecting upward from the upper surface of the base;

the hub including a fixed body and at least two arms, the arms disposed about the fixed body; and the fixed body includes an inset curve corresponding to each of the arms; a portion of each arm being disposed in one of the inset curves.

12. The storage container of claim 11, wherein the hub includes a first support platform having an upper surface; the fixed body and arms projecting up from the first support platform.

13. The storage container of claim 12, further comprising an outer wall at least partially surrounding the hub; the outer wall having a support surface.

14. The storage container of claim 11, wherein the upper surface of the fixed body is disposed higher than the upper surface of at least one of the arms.

15. A storage container for releasably securing an item of recorded media having an outer edge defining an outer diameter and an inner edge defining a centrally disposed inner hole having a hole diameter, the storage container comprising:

a base having an upper surface;

a hub projecting upward from the upper surface of the base;

the hub including a fixed body and at least two resilient arms, the resilient arms disposed about the fixed body;

the fixed body having a sidewall and an upper wall vaulting the sidewall;

each of the resilient arms having a vertical leg and an upper wall; and the upper wall of the fixed body disposed above the upper wall of each of the resilient arms.

16. The storage container of claim 15, wherein each of the resilient arms has an outer surface, the outer surfaces cooperating to have an outer diameter; the sidewall of the fixed body having an outer diameter; the outer diameter of the sidewall of the fixed body being less than the outer diameter of the resilient arms.

17. The storage container of claim 15, wherein the hub includes a first support platform carried above the upper surface of the base by an annular supportwall, the fixed body and the resilient arms extending up from the first support platform.

18. The storage container of claim 17, further comprising an outer wall having a second support platform, the second support platform being disposed no higher than the first support platform.

19. The storage container of claim 15, further comprising:

a locking detent carried on one of the resilient arms; and an unlocking detent carried on another of the resilient arms.

* * * * *